(12) United States Patent
Middleton et al.

(10) Patent No.: US 9,409,306 B2
(45) Date of Patent: Aug. 9, 2016

(54) DYNAMICALLY DIRECTED WORKPIECE POSITIONING SYSTEM

(71) Applicant: USNR, LLC, Woodland, WA (US)

(72) Inventors: Garyland Kirk Middleton, Thomasville, GA (US); Scott Erling Norton, Vancouver, WA (US); Christopher W. Blomquist, Ridgefield, WA (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 14/814,223

(22) Filed: Jul. 30, 2015

(65) Prior Publication Data

US 2016/0031110 A1  Feb. 4, 2016

Related U.S. Application Data

(60) Provisional application No. 62/031,639, filed on Jul. 31, 2014.

(51) Int. Cl.
*B26D 5/00* (2006.01)
*B26D 7/01* (2006.01)
*B26D 7/06* (2006.01)
(Continued)

(52) U.S. Cl.
CPC *B26D 5/007* (2013.01); *B26D 7/01* (2013.01); *B26D 7/0625* (2013.01); *B26D 7/2628* (2013.01); *G05B 19/402* (2013.01); *G05B 2219/50148* (2013.01)

(58) Field of Classification Search
CPC ............ B25B 5/08; B25B 1/08; B23Q 3/108; B23Q 1/0063
See application file for complete search history.

(56) References Cited

U.S. PATENT DOCUMENTS

| 4,615,093 | A | 10/1986 | Tews et al. |
| 5,689,942 | A * | 11/1997 | Suga ..................... B65B 9/067 53/374.6 |
| 5,768,759 | A | 6/1998 | Hudson |

(Continued)

FOREIGN PATENT DOCUMENTS

| CA | 27232310 A1 | 3/2009 |
| EP | 0916447 A2 | 5/1999 |

OTHER PUBLICATIONS

PCT Application No. PCT/US2015/042979 International Search Report and Written Opinion mailed Oct. 28, 2015, 22 pages.

(Continued)

*Primary Examiner* — Lee D Wilson
(74) *Attorney, Agent, or Firm* — Schwabe Williamson & Wyatt

(57) ABSTRACT

In various embodiments, a dynamically directed workpiece positioning system may include a transport, a sensor positioned to detect a workpiece on the transport, a cutting member positioned along or downstream of the transport, and a computer system. The sensor may scan the workpiece as the workpiece is moved relative to the transport by a human operator or a positioning device. Based on the scan data, the computer system may generate commands to guide the human operator or positioning device in moving the workpiece to a desired position corresponding to a cut solution for the workpiece. Optionally, the computer system may cause the cutting member to be repositioned while the workpiece is being moved relative to the transport. Once the workpiece is in the desired position, the transport may be used to move the workpiece toward the cutting member. Corresponding methods and apparatuses are also disclosed.

36 Claims, 21 Drawing Sheets

(51) Int. Cl.
   *B26D 7/26*   (2006.01)
   *G05B 19/402*   (2006.01)

(56) References Cited

U.S. PATENT DOCUMENTS

| | | | | |
|---|---|---|---|---|
| 6,655,545 | B1* | 12/2003 | Sonneborn | G06F 19/325 221/7 |
| 2002/0007616 | A1* | 1/2002 | Lamamy | B65B 13/022 53/399 |
| 2002/0156544 | A1 | 10/2002 | Koskovich et al. | |
| 2005/0257748 | A1* | 11/2005 | Kriesel | A01K 11/008 119/51.02 |
| 2007/0240547 | A1* | 10/2007 | Dick | B27M 1/08 83/76.1 |
| 2008/0184856 | A1 | 8/2008 | Koskovich | |

OTHER PUBLICATIONS

Canadian Patent Application No. 2,899,291 Office Action dated Oct. 5, 2015, 4 pages.

* cited by examiner

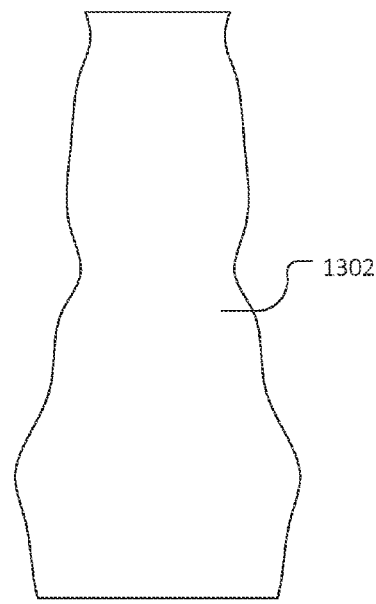 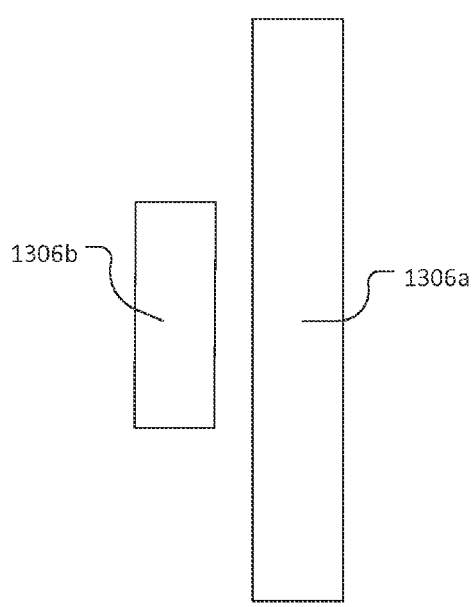
FIG. 13A  FIG. 13B
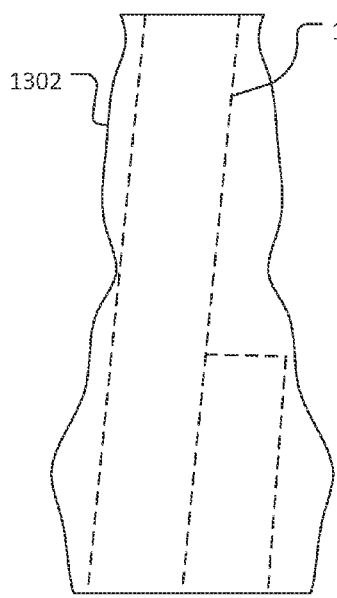 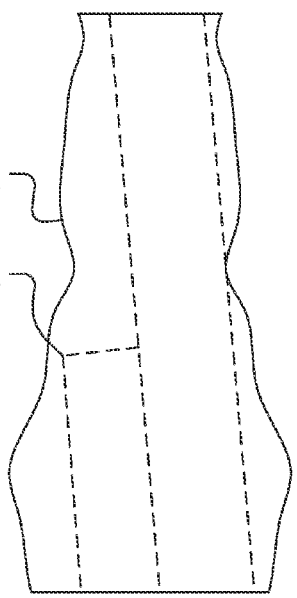 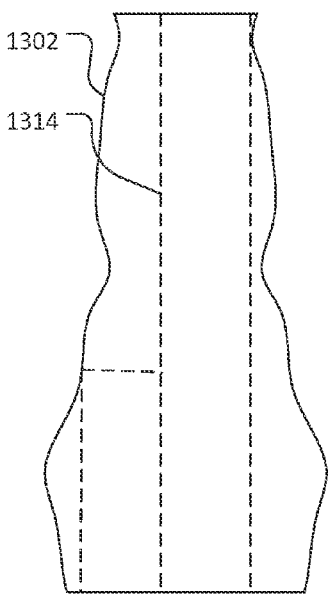
FIG. 13C  FIG. 13D  FIG. 13E

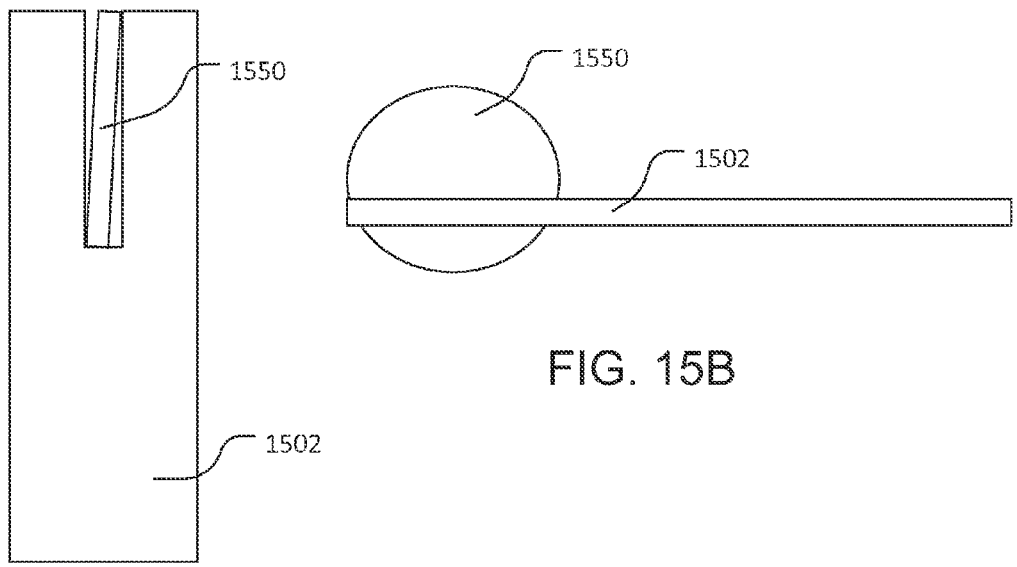
FIG. 15A
FIG. 15B
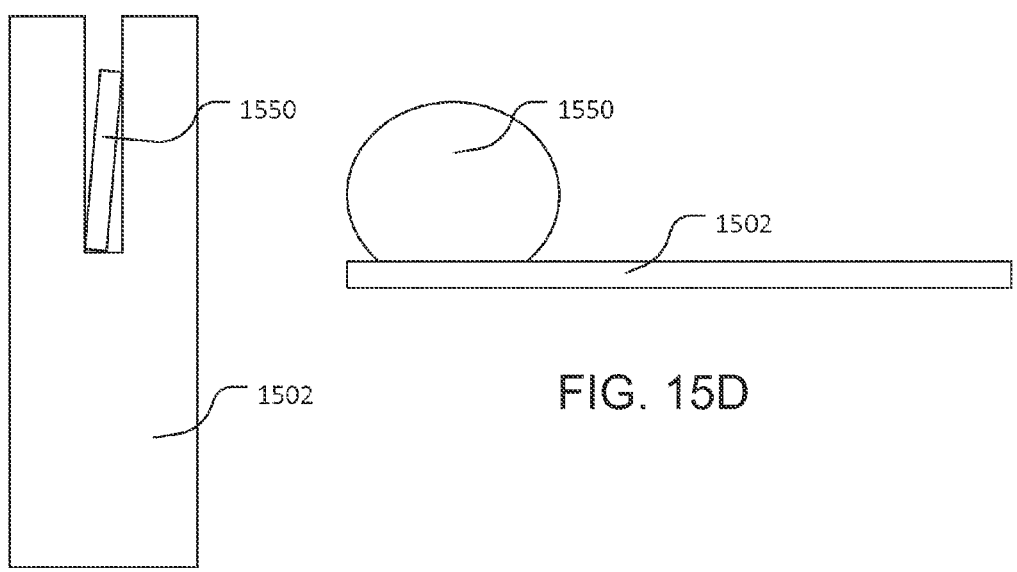
FIG. 15C
FIG. 15D

US 9,409,306 B2

DYNAMICALLY DIRECTED WORKPIECE POSITIONING SYSTEM

CROSS REFERENCE TO RELATED APPLICATION

This application claims priority from U.S. Provisional Patent Application No. 62/031,639 filed Jul. 31, 2014 entitled DYNAMICALLY DIRECTED WORKPIECE POSITIONING SYSTEM, the disclosure of which is incorporated by reference herein.

BACKGROUND

Traditionally, machine centers such as gangs have been implemented as 'dumb' systems with simple probe- or encoder-based positioning systems. Adding optimization to a machine center can increase speed and recovery, which can help to maximize profit. However, the cost of implementing optimization in such machine centers can be high. For example, implementing optimization in a simple gang according to conventional methods requires the purchase and installation of a scanner/optimizer. The entire infeed is then replaced. Finally, the controls for the motion axis are upgraded to enable positioning of the workpiece as the optimizer instructs. Thus, implementing optimization in a machine center can be expensive and time-consuming, with associated downtime increasing the overall expense of the upgrade.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 13A-13E illustrate schematic views of a cut solution and cut patterns for a workpiece;

FIGS. 15A-D illustrate schematic block diagrams of cutting member adjustments, all in accordance with various embodiments.

DETAILED DESCRIPTION OF DISCLOSED EMBODIMENTS

Figure 1A:
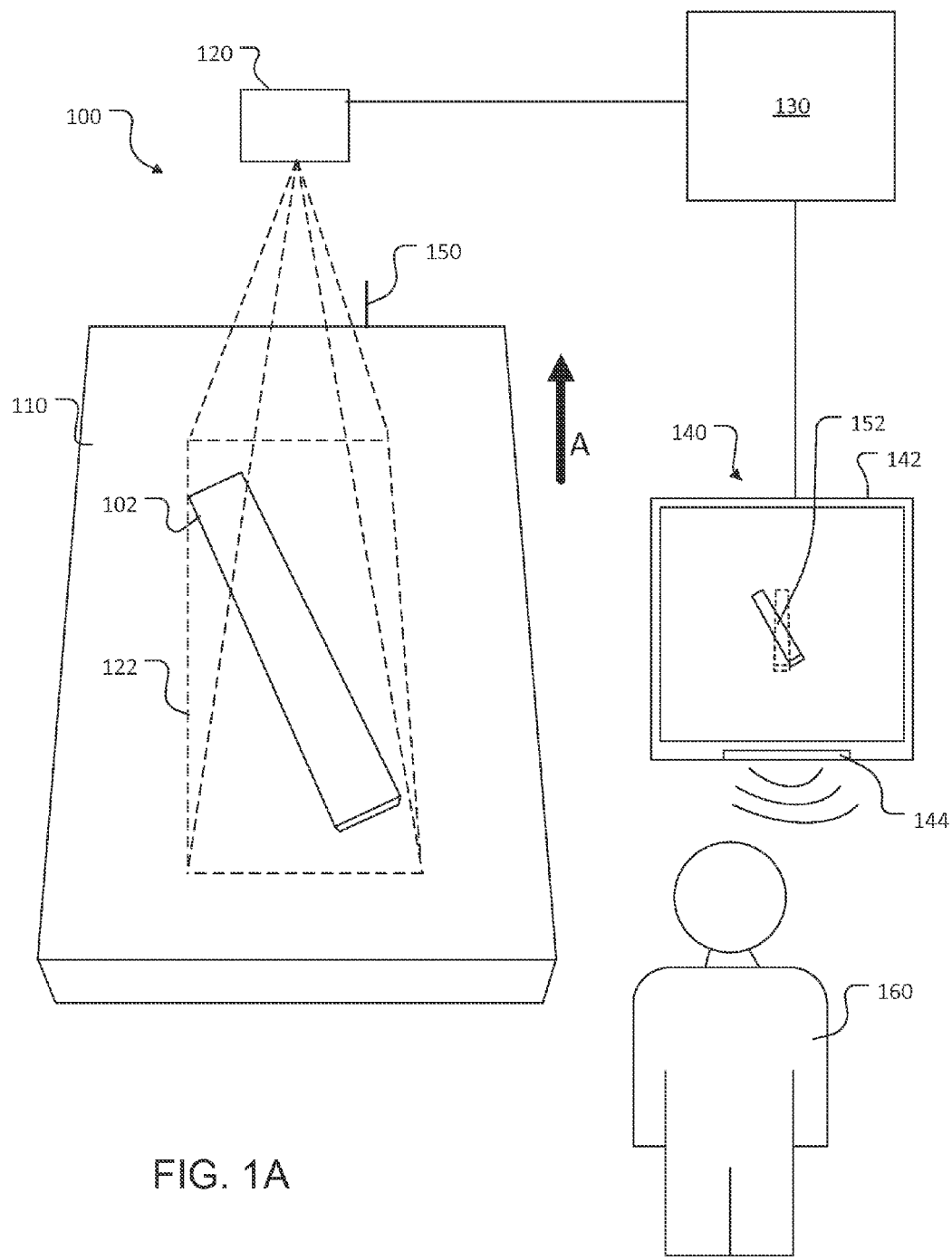
FIGS. 1A-C illustrate block diagrams of embodiments of a dynamically directed workpiece positioning systems.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computer system may be endowed with one or more components of the disclosed apparatuses and/or systems and may be employed to perform one or more methods as disclosed herein.

Various components of FIGS. 1A-4C and 13A-15D are numbered according to a numbering scheme in which the first digit corresponds to the Figure number (e.g., FIG. 1A) and the last two digits correspond to the component. As such, any description of a given component (e.g., 110) should be understood to apply equally to any other components identified by the same last two digits (e.g., 210, 310, 1210, etc.).

Embodiments of methods, apparatuses, and systems for positioning a workpiece are disclosed herein. In various embodiments, a workpiece positioning system may include a sensor positioned to detect a workpiece on a transport and a computer system operatively coupled with the sensor. The computer system may be programmed to determine an actual position of the workpiece on the transport based on data from the sensor, compare the actual position to a desired position or a cut solution/pattern, and generate instructions (e.g., to a human operator, a controller, and/or a positioning mechanism) to guide repositioning of the workpiece to the desired position. In some embodiments, the computer system may be programmed to calculate the cut solution/pattern, the desired position for the workpiece, and/or a predicted position for a downstream cutting member.

In various embodiments, the computer system may be configured to determine the actual position of the workpiece on the transport, determine a difference between the actual position and the desired position, and generate instructions for a corrective action to offset or reduce the difference. The computer system may be configured to repeat this process until the actual position of the workpiece matches the desired position within predefined limits. In other embodiments, the computer system and sensor may be collectively operable to continuously scan, optimize, and calculate/modify a cut solution or cut pattern for a workpiece while the workpiece is being repositioned on the transport within the field of view of the sensor. The computer system may also be configured to direct a human operator or a controller/positioning mechanism to move the workpiece toward a desired position that corresponds to the cut solution/pattern, and to provide confirmation when the workpiece is correctly positioned for cutting by a downstream cutting member.

In a particular embodiment, the sensor (e.g., a scanner) is mounted above the transport and communicatively coupled with a computer system that includes an optimizer. The scanner is configured to continuously scan a workpiece (e.g., a flitch) on the transport while a human operator skews and slews the flitch. The computer system is configured to receive scan data from the scanner and to determine an optimized cut solution for the workpiece. The computer system is also configured to determine one or more cut patterns for the workpiece based on the optimized cut solution, and to cause an output device (e.g., a display, a speaker, a projector) to provide directions to the human operator for adjusting the position of the workpiece. Optionally, the optimizer may continuously adjust or recalculate an optimized cut solution and/or cut pattern(s) as the position of the workpiece is changed relative to the transport.

As the sensor and computer system continuously scan and optimize the workpiece, the output device may continue to provide directions to the human operator until the workpiece has been moved to a desired position for cutting the workpiece according to the cut solution/cut pattern. The directions may instruct the human operator to rotate, skew, slew, or otherwise move the workpiece relative to the transport to achieve the desired position. The output device may provide the directions visually on a display device (e.g., as an image on a computer monitor) and/or on the transport or workpiece (e.g., as a projected image). Alternatively, the output device may provide the directions as an auditory signal in the form of speech (e.g., "rotate clockwise 10 degrees") and/or other sounds (e.g., a sound or series of sounds that changes pitch/frequency/duration as the workpiece approaches the optimized position).

Once the workpiece is in the desired position, the transfer may be operated in the flow direction to convey the workpiece to the cutting member, which may be used to cut the workpiece. Optionally, the computer system may be configured to adjust the position of the cutting member to offset a difference between the actual workpiece position and the desired workpiece position.

In other embodiments, an existing 'dumb' (e.g., probe-based or encoder-based) machine center may be upgraded with a sensor/computer system as described above to implement optimization at lower cost than in prior methods. For example, instead of purchasing a scanner/optimizer, replacing the entire infeed and upgrading the controls for the motion axis, optimization may be implemented by coupling an existing machine center and/or workpiece positioning system with a sensor and computer system as described herein. Collectively, the sensor and computer system may be used to direct the positioning of a workpiece on an existing transport (e.g., a conveyor). When the workpiece is placed on the transport in the field of view of the sensor, the sensor may detect the workpiece and the computer system may calculate the optimized position based on the sensor data. The computer system may direct the existing positioning system to reposition the workpiece to the optimized position, after which the transport may be operated to feed the repositioned workpiece to the existing machine center. Optionally, one or more controllers may be coupled with the computer system and the existing positioning device to provide automated or semi-automated repositioning of the workpiece. As long as the positioning system is at least somewhat controllable, or can be easily modified to be so, the cost of implementing optimization on edgers, gangs, and even log breakdown machines like end-doggers can be radically reduced.

Figure 1B:
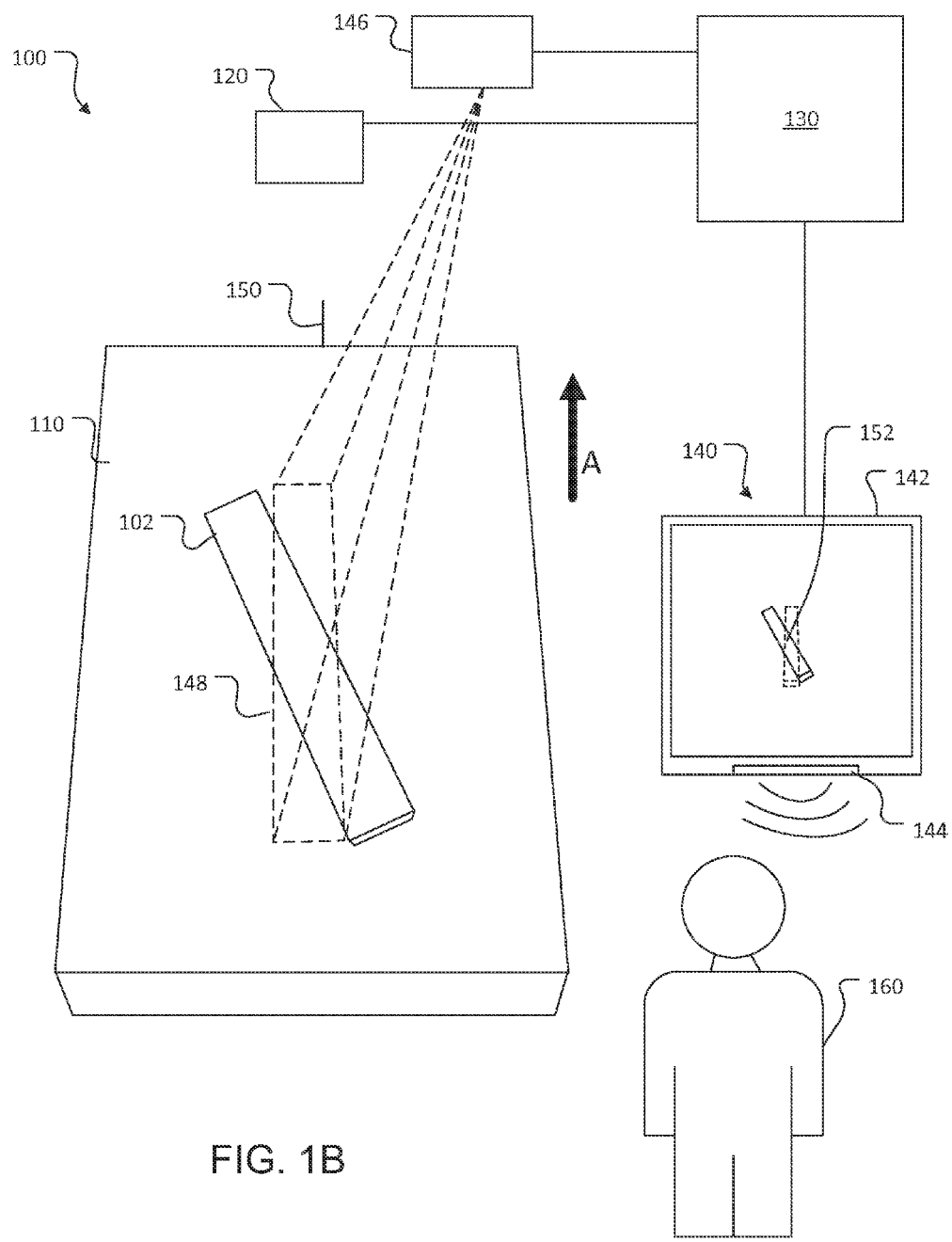
Figure 1C:
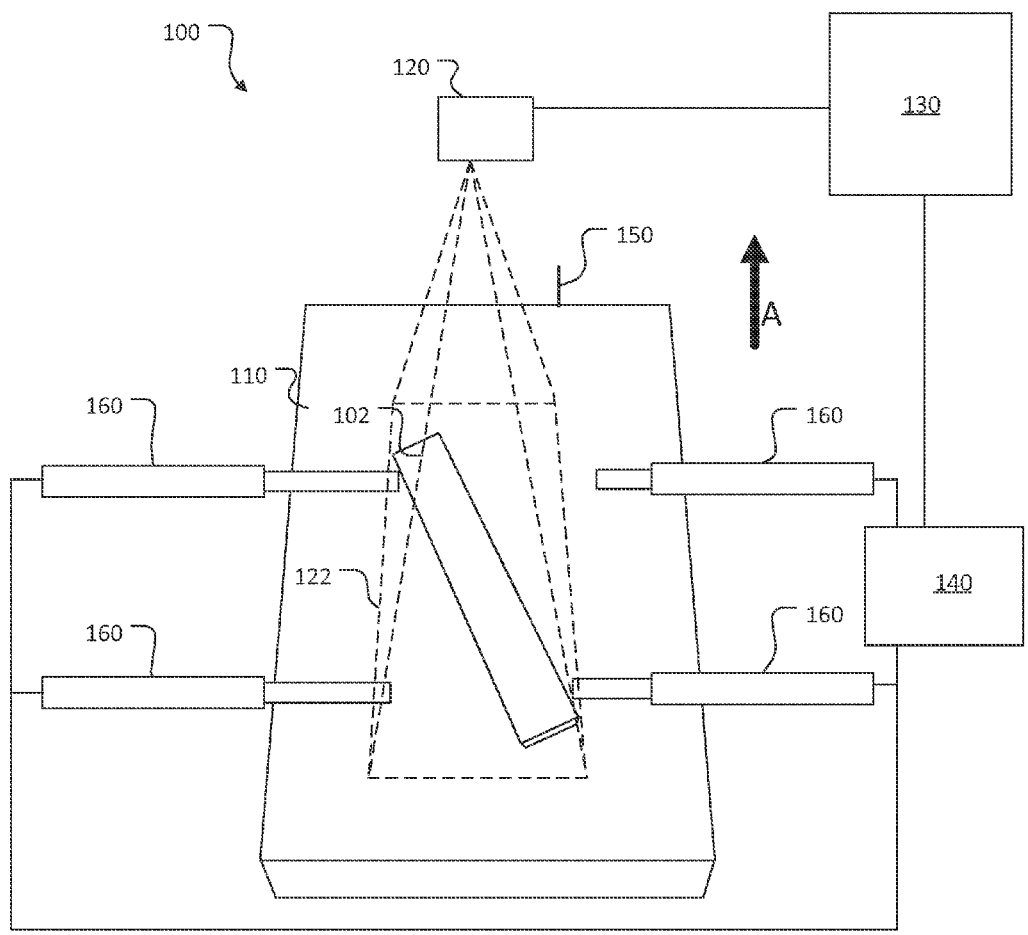

FIGS. 1A-C illustrate block diagrams of embodiments of a dynamically directed workpiece positioning system 100.

Referring first to FIG. 1A, system 100 may include a sensor 120 and a computer system 130 in electronic communication with the sensor. In some embodiments, system 100 may further include one or more of a transport 110, an output device 140, a cutting member 150, and/or a positioner 160.

Transport 110 may be configured to transport a workpiece 102 such as a log, a cant, a flitch, or a board. In some embodiments transport 110 may be a stationary transport, such as a table. In other embodiments transport 110 may be a movable transport, such as a conveyor.

Sensor 120 may be configured to detect the workpiece within a field of view 122 and to generate corresponding sensor data. Sensor 120 can include, but is not limited to, one or more cameras, scanners, lasers, and/or other such devices, alone or in any suitable combination. In some embodiments, sensor 120 may include a laser triangulation system. In other embodiments, sensor 120 may include a vision camera (e.g., a video camera) configured to capture visual images of the workpiece. In some embodiments, sensor 120 may include a first sensor configured to detect workpiece distance/geometry/position (e.g., a laser distance sensor, a 3D scanner, a 2D sensor, a laser triangulation scanner) and a second sensor configured to capture a visual image of the workpiece (e.g., a camera). Sensor 120 may be positioned above, below, or alongside transport 110, such that at least a portion of the transport 110 is within the field(s) of view 122 of sensor 120.

Computer system 130 and/or sensor 120 may include an optimizer. In some embodiments, any one or more of the sensor, the computer system, and/or optimizer may be separate components that are coupled together physically and/or electronically (e.g., by a wireless connection). In other embodiments, the sensor, the computer system, and/or the optimizer may be integrated within a single device. In still other embodiments, two or more devices may collectively perform the functions of the sensor, computer system, and/or optimizer.

In various embodiments, computer system 130 may be configured to determine an actual position of the workpiece based on data from sensor 120 and to compare the actual position of the workpiece to a cut solution/pattern for the workpiece. Computer system 130 may be configured to generate, based at least on the comparison, one or more commands configured to cause the workpiece to be moved relative to the transport to a desired position that corresponds to the cut solution.

In some embodiments, computer system 130 may be configured to determine whether a difference between the actual workpiece position and the desired position can be offset by repositioning the cutting member or by modifying the cut solution/pattern. This may allow the workpiece to be cut according to the cut solution/pattern without repositioning the workpiece.

In various embodiments, computer system 130 may be configured to calculate the cut solution (e.g., an optimized cut solution) and/or a cut pattern for the workpiece based on the sensor data. The cut solution may define the dimensions of one or more pieces to be cut from the workpiece. The cut pattern may define one or more cut lines along which the workpiece can be cut to yield the piece(s) with the dimensions defined by the cut solution. In some cases, several cut patterns or modifications to cut patterns may be calculated for one cut solution. For example, if a cut solution defines a 6" wide piece to be cut from a workpiece that is 8" wide, one cut pattern may have cut lines 1" from each side of the workpiece and another cut pattern may have a cut line 0.5" from one side and 1.5" from the opposite side of the workpiece, or cut lines that are angled relative to a centerline of the workpiece. As another example, a cut pattern may be modified by changing the position of one cut line with respect to another cut line, or by changing the position of all of the cut lines collectively with respect to the workpiece.

Optionally, computer system 130 may be configured to determine one or more workpiece characteristics such as workpiece dimensions, wane, defects (e.g., knot, split, shake, check, warp, discoloration), and/or grade, based on data from sensor 120. Computer system 130 may be configured to determine the cut solution for a workpiece based at least in part on the identified defects and/or grade. In other embodiments, computer system 130 may be configured to receive a preferred position, a cut solution, and/or a cut pattern from an optimizer or another computer system. Alternatively, computer system 130 may be configured to calculate the cut solution or cut pattern based at least in part on input by a human operator (e.g., a workpiece grade, a desired product, a wood species).

Computer system 130 may optionally be configured to determine the desired position for the workpiece. The desired position may be a position that corresponds to the cut solution. In other words, the desired position may be a position in which the workpiece could, if moved in the direction of flow to the cutting member without further repositioning, be cut according to the cut solution. In some embodiments, computer system 130 may be configured to determine a desired position for the workpiece based at least in part on the cut solution, cut pattern, and/or an actual or predicted position of a cutting member disposed downstream of the scanner. Computer system 130 may also be configured to recalculate the desired position to account for a modification to another parameter (e.g., a new or modified cut pattern/solution, a change in the predicted position of a downstream cutting member, a change in the actual position of the workpiece). Optionally, computer system 130 may be configured to generate a dimensional model of the workpiece based on the sensor data, and to perform any of the calculations/determinations described herein based on the dimensional model.

In various embodiments, computer system 130 may be configured to generate one or more workpiece positioning instructions based on an actual position of the workpiece and the cut solution/pattern or desired position. In some embodiments, computer system 130 may be configured to send the instruction(s) to an output device, such as output device 140. Output device 140 may be configured to output instructions to direct positioner 160 to move the workpiece to the desired position, such that the workpiece can be cut by cutting member 150 according to the cut solution/pattern.

Cutting member 150 can be, but is not limited to, a cutting member of an edger, a trimmer, a chipper, a profiler, a saw, or a planer. In various embodiments, cutting member 150 may be positioned upstream, downstream, or along transport 110. Other embodiments may lack cutting member 150.

In some embodiments, positioner 160 may be a positioning device configured to push, pull, rotate, skew, slew, or otherwise manipulate a workpiece on the transport, and output device 140 may be a programmable logic controller (PLC) or other type of controller configured to control the positioning device in response to instructions from computer system 130 (FIG. 1C). For example, positioner 160 may include one or more actuators (e.g., linear positioners, hydraulic cylinders, lifts, a linebar, chains, skids, flights) and output device 140 may be a PLC configured to control each of the actuators independently and/or collectively to move the workpiece to the desired position relative to transport 110. Actuators may be hydraulic, pneumatic, electric, or other types of actuators. In other examples, positioner 160 may include one or more mechanisms configured to rotate, raise, lower, skew, and/or slew transport 110. In various embodiments, positioner 160 may include one or more chains (e.g., spotting chains, a flighted chain), flights, skids, linebars, pins, or other suitable types of positioning devices. Some embodiments may include multiple positioners 160. Optionally, positioner(s) 160 may be controlled automatically (e.g., by computer system 130). Alternatively, positioner(s) 160 may be controlled by a human operator via a joystick, keyboard, computer mouse, touchscreen, or any other suitable controller. Some embodiments may lack positioner 160.

Alternatively, positioner 160 may be a human operator, and output device 140 may be configured to provide visual and/or auditory directions to the human operator in response to instructions from computer system 130 (FIGS. 1-3). The directions may be configured to guide the human operator in repositioning the workpiece toward the desired position on the transport, such that the workpiece can be cut by cutting member 150 according to the cut solution.

In various embodiments, output device 140 may include, or may be operatively coupled with, a display 142 and/or a speaker 144.

Display 142 may include, for example, a liquid-crystal display, a cathode-ray tube display, an e-ink display, or a touch screen. Display 142 may be configured to display an image 152 in response to instructions generated by the computer system 130. In various embodiments, image 152 may include a visual representation of the workpiece (or a portion thereof) in its actual position on transport 110 and a visual representation of the desired position or cut solution/pattern. Optionally, image 152 may include one or more alignment marks (e.g., a grid, a ruler, an arrow, a line that indicates a position of a cutting member). In some embodiments, display 142 and speaker 144 may be integrated within output device 140. Other embodiments may lack display 142 and/or speaker 144.

Speaker 144 may be, or may include, an electroacoustic transducer that produces sound in response to an electrical audio signal input from output 140/computer system 130. In some embodiments, speaker 144 may output auditory directions to the human operator in the form of speech (e.g., "move two inches to left"). In other embodiments, speaker 144 may output auditory directions to the human operator in another form, such as a continuous signal or series of signals, and the directions to the human operator may be a function of tone and/or the time between emissions of the signal. For example, speaker 144 may emit a sound at intervals, and the duration of the intervals may be a function of the distance between the actual workpiece position and the preferred position (e.g., with intervals between sounds becoming shorter as the workpiece approaches the preferred position). As another example, speaker 144 may emit a sound continuously or discontinuously, with the tone, pitch, timbre, and/or volume rising or falling based on the distance between the actual workpiece position and the desired position. Optionally, speaker 144 may be integrated within output device 140. Alternatively, speaker 144 may be a separate device. For example, in some embodiments, speaker 144 may be integrated within a headset or other device configured to be worn by a human operator.

Optionally, system 100 or output device 140 may include a projector 146 operatively coupled with computer system 130 (FIG. 1B). Projector 146 may be any type of optical device configured to project an image onto a surface. Examples of suitable projectors include, but are not limited to, video projectors, laser projectors/devices, and digital micro-mirror devices (DMD's). Projector 146 may be configured to project an image 148 onto transport 110 and/or workpiece 102 in response to instructions generated by the computer system 130. In various embodiments, image 148 may be an image of the workpiece (or a portion thereof). The image may be projected onto the desired position on transport 110 to indicate the desired position to a human operator. In other embodiments, image 148 may include an image of one or more cut lines, a cut pattern, and/or one or more alignment marks (e.g., a grid, a ruler, an arrow, a line to indicate a position of the cutting member). Optionally, projector 146 and sensor 120 may be integrated within a single unit. Alternatively, projector 146 and sensor 120 may be separate devices. In some embodiments, any one or more of output device 140, speaker 144, display 142, or projector 146 may be integrated with computer system 130 in a single device.

In some embodiments, projector 146 or one or more other projectors, lasers, or the like may be operatively coupled with cutting member 150 and operable to project an image of a cut line along a plane of cutting member 150. In embodiments with multiple cutting members 150, the projector/laser may be configured to project an image of a cut line along the plane of each cutting member 150 or selected ones of the cutting members 150. For example, in some embodiments the projector/laser may be configured to project an image of a cut line along the plane of the cutting members 150 that will be used to cut the next workpiece. Optionally, the projector/laser may be configured to slew/skew the projected cut line(s) as the corresponding cutting member(s) 150 skews and slews. In other embodiments, the projector/laser may be configured to project an image of a cut line along the plane of the end-most cutting member(s) 150 or the middle cutting member(s) 150.

Figure 2A:
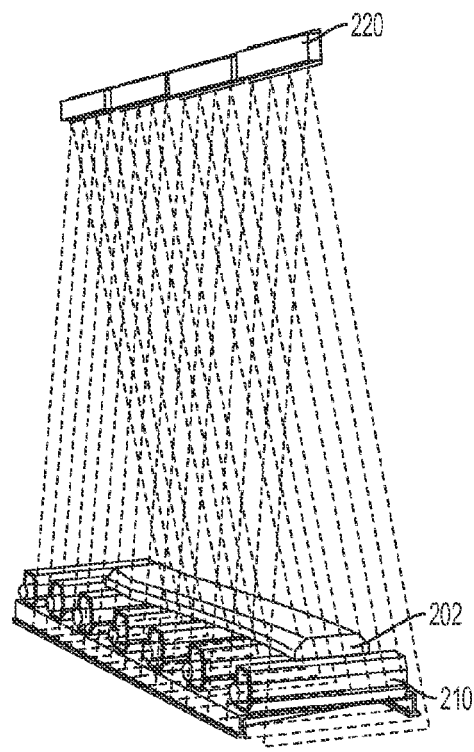
FIGS. 2A-B illustrate perspective views of example sensor configurations.
Figure 2B:
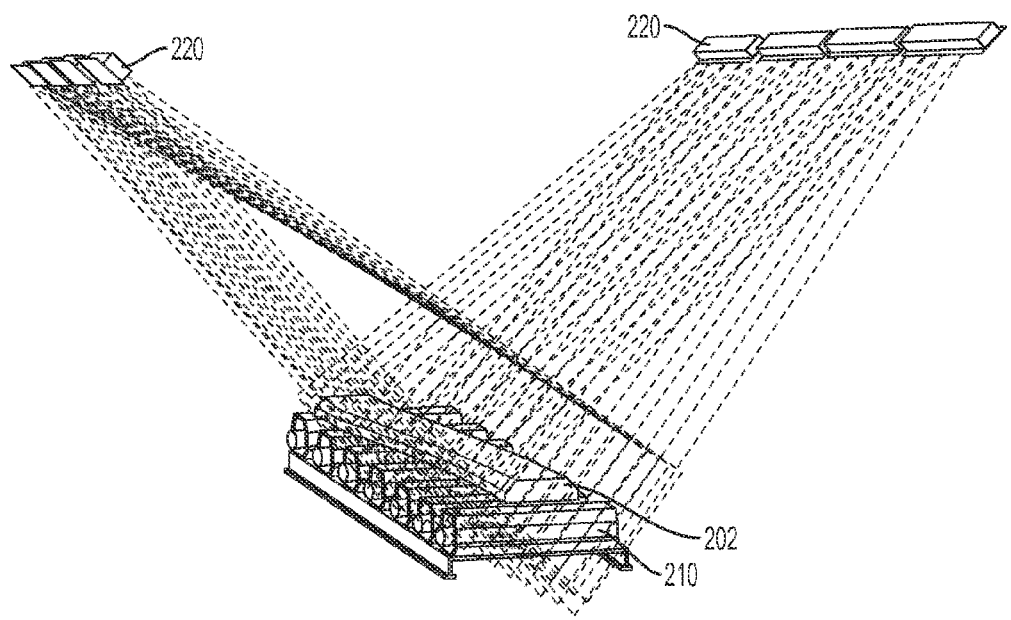

FIGS. 2A-B illustrate perspective views of example sensor configurations, in accordance with various embodiments. Again, the present disclosure identifies various components by three-digit numbers, and any description of a component identified by a given last pair of digits (e.g., 110) should be understood to apply equally to other components so identified (e.g., 210, 310, 310, etc.).

In some embodiments, sensor 220 may include a plurality of sensors arranged above the transport 210. For example, as illustrated in FIG. 2A, sensor 220 may include a plurality of cameras, scanners, or other imaging devices mounted above the transport 210 to form a single line of sensors spaced apart at intervals (e.g., at 6 inch intervals). Alternatively, the sensors may be arranged in two lines above and to each side of transport 210, as shown for example in FIG. 2B, such that their fields of view include the upper face and some portion of the sides of the workpiece 202. These examples are provided merely by way of illustration, and are not intended to be limiting. In other embodiments the sensors may be provided in any suitable number, arrangement, and/or configuration.

In some embodiments, a conventional workpiece processing system may be upgraded to include a dynamic positioning system as described herein. This may allow the elimination of one or more positioning mechanisms from the prior system. For example, a conventional edger system includes an edger infeed with rotatable rolls for conveying the workpiece into the edger, positioning pins, and vertically adjustable skids positioned between the rolls. Each skid has a corresponding chain or belt that can be rotated to move the workpiece across the width of the infeed, and the positioning pins can be moved in the flow direction across the infeed to stop the workpiece in a desired position for cutting. In operation, individual workpieces would be conveyed on a chain conveyor onto the adjustable skids. The chains or belts would be rotated in the flow direction to move the workpiece into contact with the positioning pins to thereby position the workpiece. Once the workpiece is in the correct position, the skids would be lowered to allow the workpiece to contact the rolls, and the rolls would be rotated to convey the workpiece into the edger.

FIGS. 3A-E illustrates plan views of embodiments of a workpiece processing system 300. In various embodiments, system 300 may be obtained by adding a sensor (e.g., sensor 120/220) and/or a computer system (e.g., computer system 130) to the existing workpiece processing system. Alternatively, in some embodiments an existing computer system may be programmed to implement the functionality/operations described herein. The sensor may be positioned above an existing transport/infeed and coupled with the computer system. Optionally, the computer system may also be coupled with one or more positioning mechanisms (e.g., positioner 160) of the existing system.

Figure 3A:
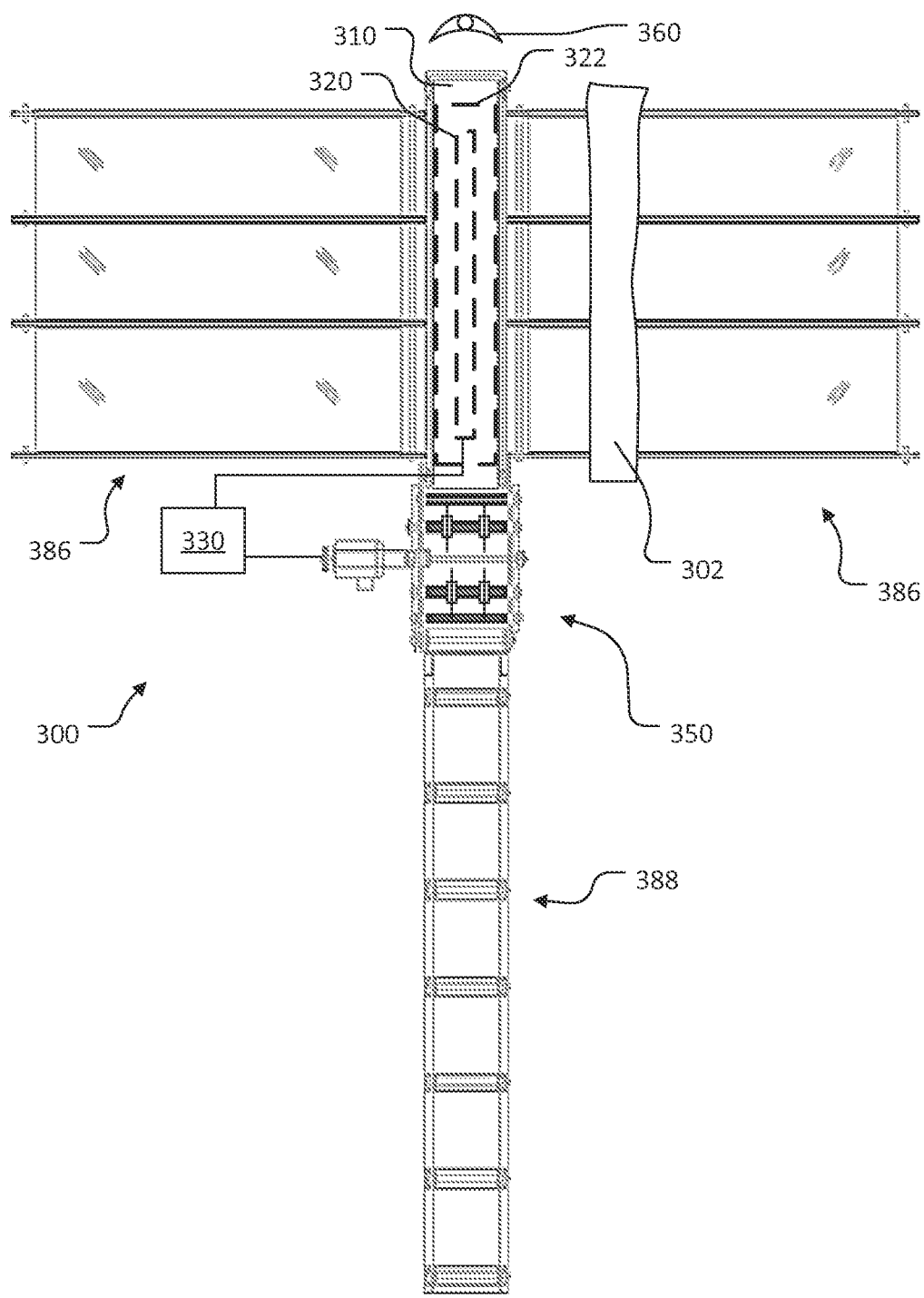
FIGS. 3A-E illustrates plan views of embodiments of a dynamically directed workpiece positioning system.

Referring first to FIG. 3A, a workpiece processing system 300 may include one or more of an infeed 310, conveyor(s) 386, and cutting member(s) 350. Cutting member(s) 350 may be one or more saws of a cutting assembly. As described further below with reference to FIG. 14, in some embodiments cutting member(s) 350 may be one or more saws of a cutting assembly that includes a slewing assembly (e.g., cutting assembly 1400). In other embodiments, cutting member(s) 350 may be one or more saws of a gang saw or an edger saw. While FIG. 3A illustrates a dual arbor saw assembly, other embodiments may have a single arbor saw assembly. Optionally, system 300 may further include an outfeed 388 downstream of cutting members 350.

Optionally, some or all of the infeed 310, conveyor(s) 386, cutting member(s) 350, and outfeed 388 may be components of an existing system, such as an existing edger, canter, or gang saw system. However, system 300 may further include a sensor 320 positioned above infeed 310 and a computer system 330 operatively coupled with sensor 320. Optionally, computer system 330 may also be operatively coupled with, and operative to control, cutting member(s) 350. For example, computer system 330 may be operatively coupled with a driver, a slewing assembly, a saw box positioner, a saw guide, and/or any other component operable to control the speed, position, or other operations of the cutting member(s) 350.

Sensor 320 may have a field of view 322 that encompasses some or all of the upper surface of the infeed. In some embodiments, sensor 320 may include a plurality of sensors arranged above the infeed 310. For example, as illustrated in FIGS. 2A-B, sensor 320 may include a plurality of line scanners arranged to form one or more lines of sensors spaced apart at intervals (e.g., at 6 inch intervals) above the infeed 310.

In operation, the workpiece may be conveyed on conveyor 386 to infeed 310. Optionally, a human operator (indicated as 360 in FIG. 3A) may activate a control (e.g., a "grade" button) to cause the sensor 320 to scan the workpiece on the infeed 310. Alternatively, the sensor 320 may automatically begin to scan the workpiece without input from the human operator. The computer system 330 may receive scan data from the sensor 320. Optionally, based at least one the scan data, the computer system 130 may calculate a desired cut solution/pattern and/or a desired location for the workpiece. In some embodiments, the computer system 330 may generate instructions to direct the human operator to move the workpiece relative to the infeed 310. For example, the instructions may be instructions to one or more output devices (e.g., a speaker, a display, a projector) as described above.

Figure 3B:
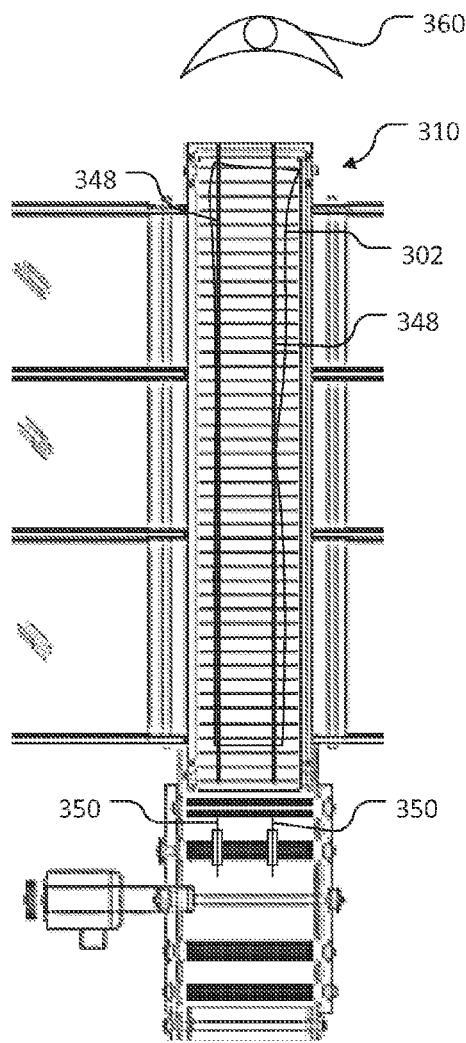
Figure 3C:
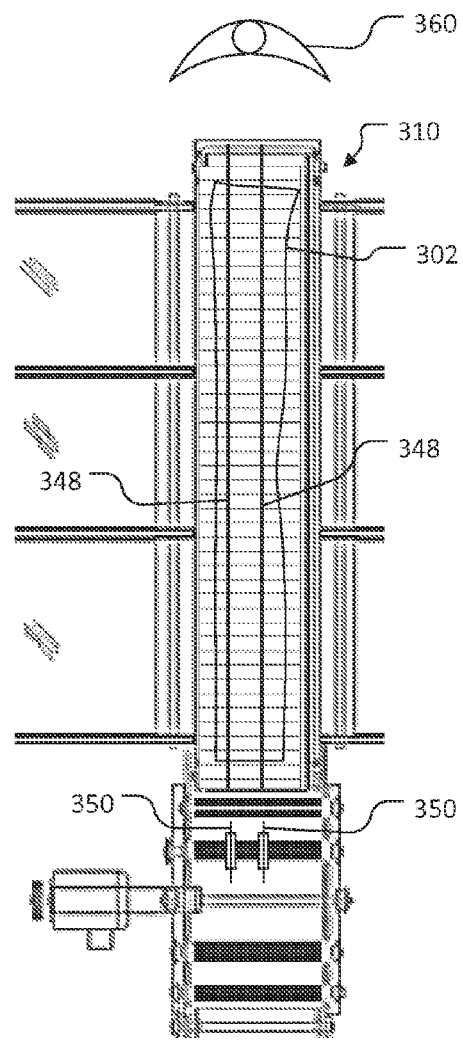
Figure 3D:
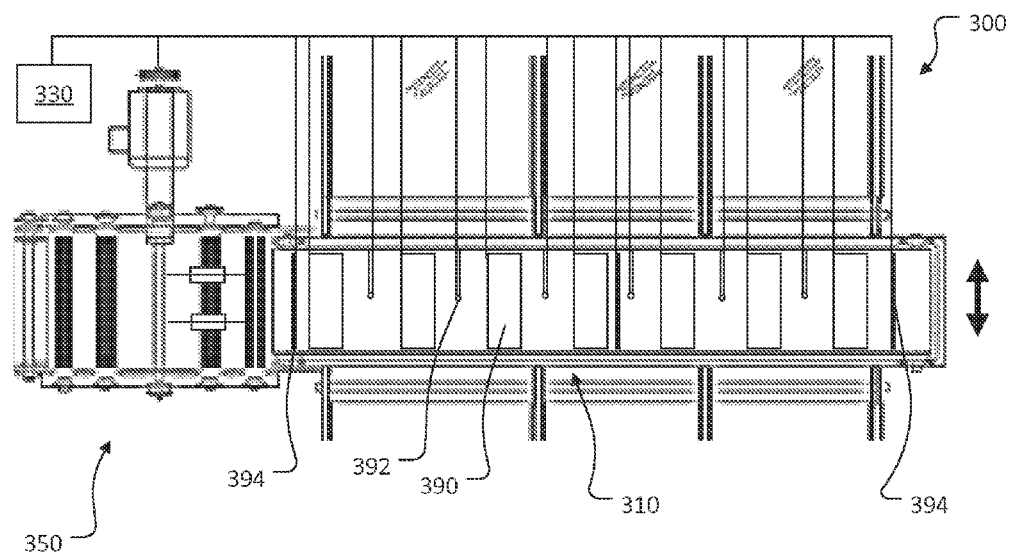
Figure 3E:
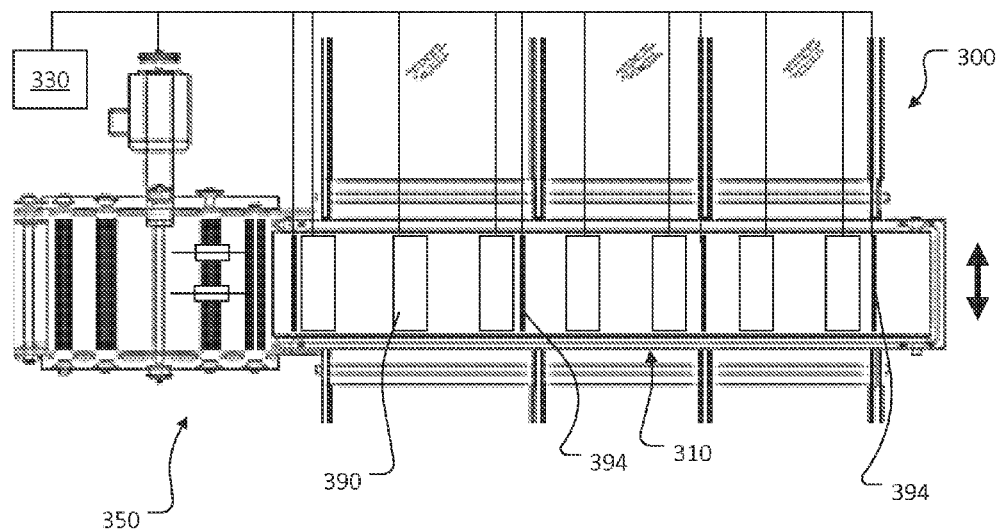

In some embodiments, as shown by way of example in FIGS. 3D-E, the computer system 130 may cause one or more projectors (e.g., projector 146) to project one or more images 348 onto workpiece 302 and/or infeed 310 in order to guide the human operator in repositioning the workpiece. For example, the projected image(s) 348 may be one or more laser lines that indicate predicted cut lines. The image(s) may be projected from above the infeed 310 or from another location, such as a saw box or saw assembly downstream of infeed 310. In some embodiments, the computer system 330 may be programmed to cause the cutting member(s) 350 and projected image(s) 348 to be repositioned synchronously, such that the position of one reflects the position of the other in real time. In other embodiments, as described for example in reference to FIGS. 4A-C below, the computer system 330 may control another output device (e.g., display 142) to output other visual representations of the workpiece, predicted cut lines, and/or cut solution instead of, or in addition to, causing a projector to project images 348. Optionally, the computer system 330 may cause the same or another output device to output a visual or auditory signal (e.g., a green light, a particular sound) to indicate that the workpiece has been moved to the desired position.

Once the workpiece is in the desired position, the infeed may be operated to convey the workpiece to the cutting member(s) 350. In some embodiments, system 300 may be configured to allow the human operator to make an adjustment to the cutting solution/pattern. For example, system 300 may include a manual control, such as a joystick and/or button, that allows a human operator to adjust the position of a projected image 348 (e.g., to avoid a defect such as a knot, wane, or discoloration in the intended cut product). Based on the input, the computer system 330 may adjust the positions of the projected image 348 and the corresponding cutting member 350. System 300 may also be configured to cause the infeed 310 to transport the workpiece to the cutting member(s) 350 in response to input from the human operator (e.g., by pressing a foot pedal, a button, or other control).

In a particular embodiment, the human operator loads a workpiece from the conveyor 386 onto infeed 310. The human operator may also press a grade button. As soon as the workpiece is on infeed 310, the workpiece is scanned continuously by sensor 320. The computer system 130 causes one or more output devices (e.g., a projector, a light source) to direct the human operator to skew the end of the workpiece to the left or to the right. The output device(s) may provide directions in the form of images 348 and/or in another form, such as a red or green light or an auditory signal. As the workpiece is being moved by the human operator, the sensor 320 continues to detect the workpiece and the computer system 330 continues to recalculate/modify the cutting solution based on the additional information from sensor 320.

As shown for example in FIGS. 3B and 3C, the computer system 330 may reposition images 348 and cutting member(s) 350 synchronously in real time to track the cut solution as the workpiece is being moved and the cut solution is being recalculated/modified. In addition, the human operator can manually adjust the cut solution/cutting members 150 by using an input device (e.g., a joystick, buttons, a foot pedal; not shown) to manually adjust the locations of the cut lines in order to maximize the value based on visual defects, clear wood, a split, desired product attributes/dimensions, or the like. Again, the computer system 330 may move the images 348 to track the position of the cutting members 150 in real time.

When the workpiece has been moved to a desired position that aligns with the cut solution, the computer system 330 causes an output device to direct the human operator to stop moving the workpiece (e.g., by causing a light source to emit a green light, or causing a speaker to emit a particular sound). At that time, the cutting members are already in position to cut the workpiece. The infeed is activated to move the workpiece forward (e.g., automatically by computer 330, or by a button or footswitch operated by the human operator). As the workpiece moves toward the cutting member(s) 150, the workpiece may be scanned again to obtain data from any previously undetected portions of the workpiece.

Modifying a manual edger or gang saw in this manner may provide a cost effective alternative to replacing the manual edger with an entirely new system, and without compromising the optimized solution or sawing accuracy. Such embodiments may be used to obtain maximum piece rates of 12 ppm or more while using human operators to position the workpieces, and may decrease variability in results among different human operators.

In other embodiments, system 300 may include, or may be configured for use with, one or more mechanical (i.e., non-human) positioners. Referring now to FIGS. 3D and 3E, system 300 may include one or more components of an existing workpiece processing system, such as an infeed 310 with rotatable rolls 390 for conveying the workpiece into the cutting members 350, vertically adjustable conveyors 394 (e.g., skids with a rotatable chain or belt), and/or positioning pins 392 (FIG. 3B) generally as described above. Vertically adjustable conveyors 394 may be rotatable in one or both directions indicated by the double-headed arrow. Likewise, positioning pins 392 may be movable across the infeed 310 in the directions indicated by the double-headed arrow.

In addition, system 300 may include sensor 320 positioned to detect a workpiece on infeed 310 and computer system 330 coupled with sensor 320. In some embodiments, computer system 330 may be operatively coupled with, and programmed to control, positioning pins 392 (FIG. 3B) and/or vertically adjustable conveyors 394. For example, as shown in FIG. 3B, computer system 330 may be operatively coupled with some or all of the positioning mechanisms of the existing system. In other embodiments, as shown for example in FIG. 3C, computer system 330 may be operatively coupled with vertically adjustable conveyors 394. Computer system 330 may be programmed to control vertically adjustable conveyors 394 independently to position the workpiece in the desired position without the use of positioning pins 392 or other such devices. For example, instead of controlling vertically adjustable conveyors to simply convey the workpiece and using the positioning pins to stop the workpiece at the desired position, computer 330 may be programmed to selectively control the rotation of each of the belts/chains of vertically adjustable conveyors 394 to move the workpiece to the desired location and skew angle on infeed 310, and to lower the vertically adjustable conveyors 394 once the workpiece is in the desired position.

Alternatively, in other embodiments computer system 330 may be operatively coupled with, and programmed to control, one or more other mechanical positioners such as positioning pins, a movable fence, or other stop members to position the workpiece on infeed 310. In still other embodiments, the entire infeed 310 may be, or may be modified to be, the mechanical positioner. For example, the infeed 310 may be selectively repositionable, and computer system 330 may be operatively coupled with, and programmed to control, the infeed 310 to slew, skew, and/or elevate the workpiece to the desired position. Regardless of the type of positioning mechanism used, an existing manual system may be upgraded as described herein to implement optimization and/or semi-automatic or fully automatic workpiece positioning in a more economic and efficient manner than was possible in prior methods.

Figure 4A:
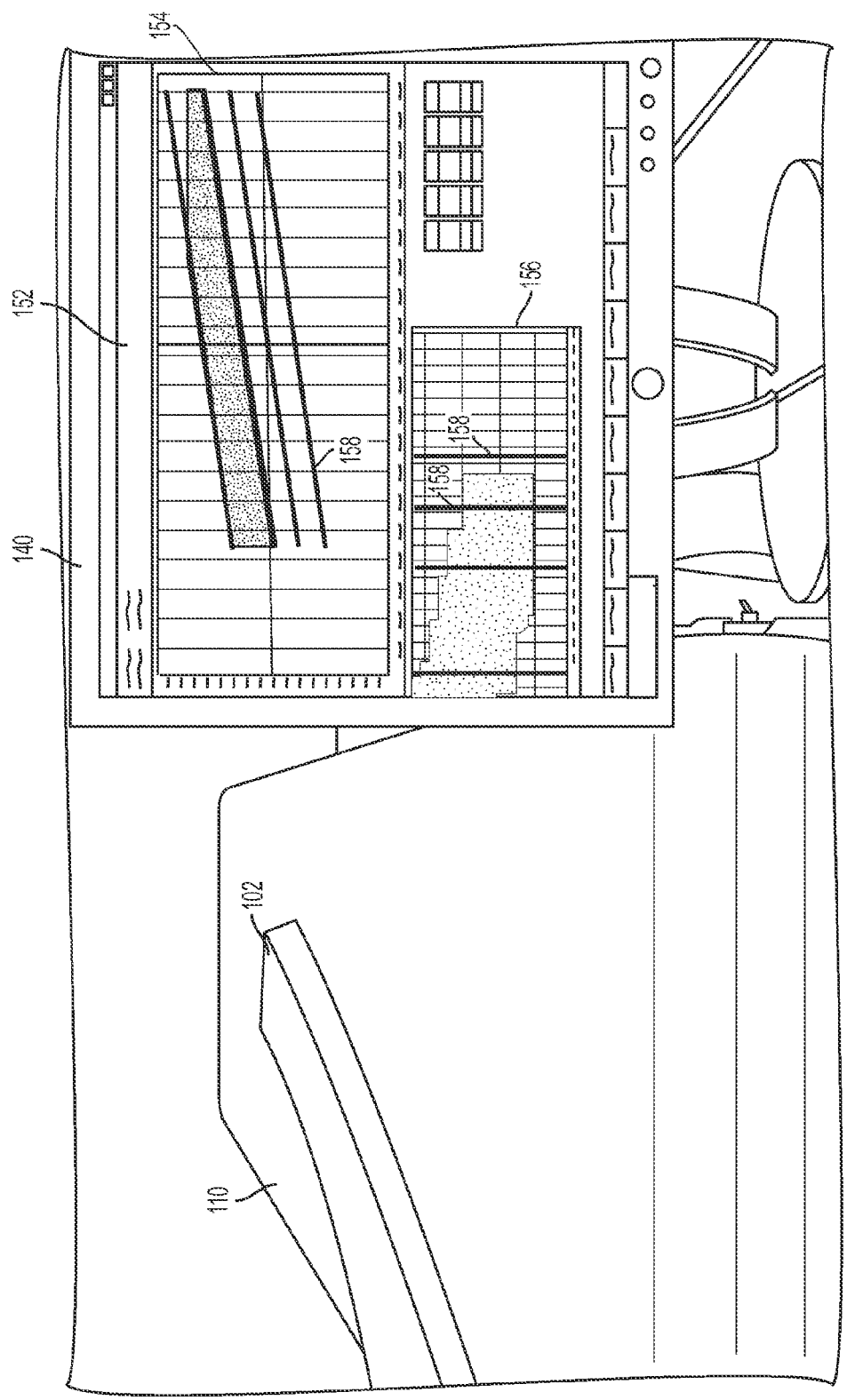
FIGS. 4A-C illustrate an example implementation of a dynamically directed workpiece positioning system.
Figure 4B:
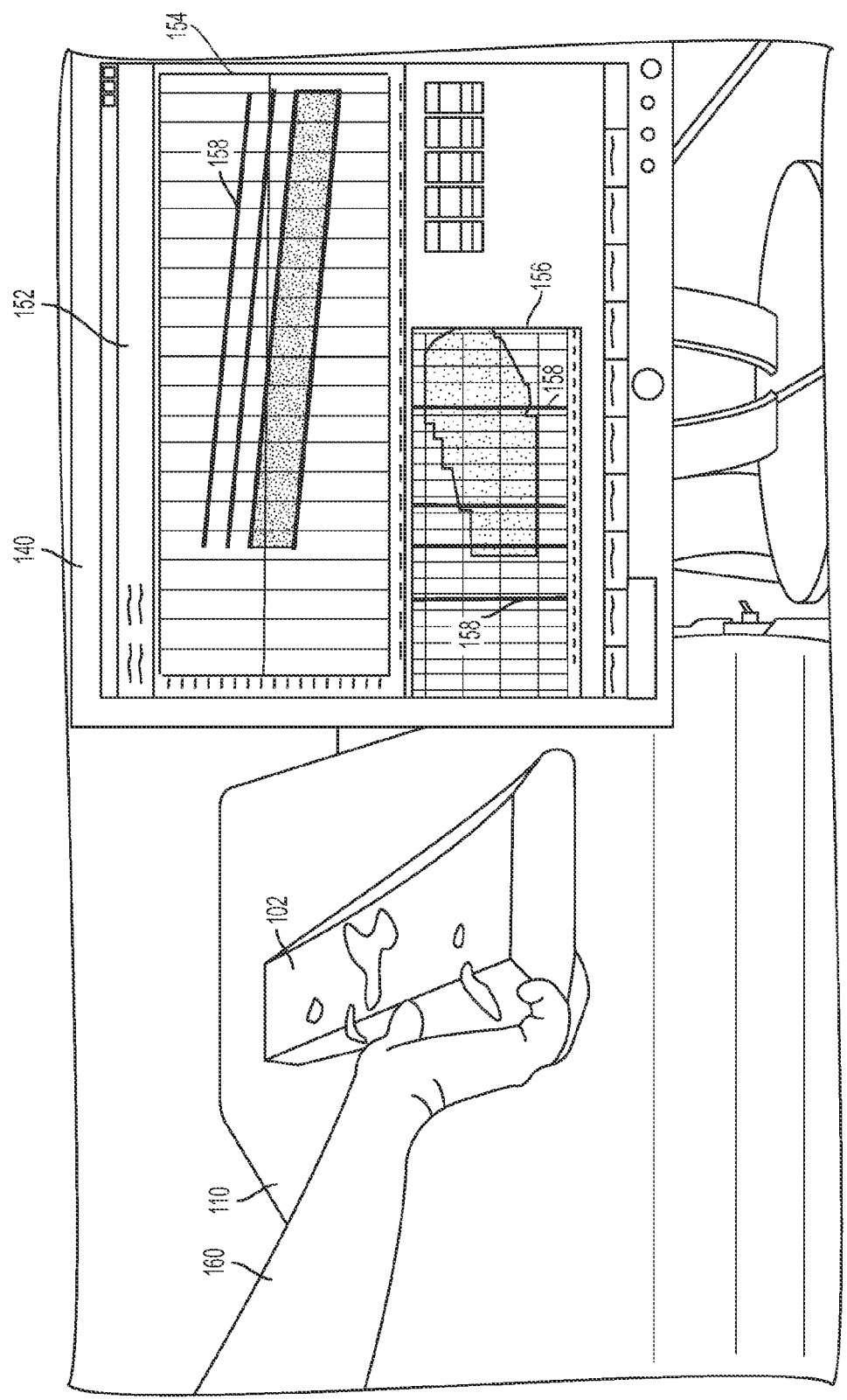
Figure 4C:
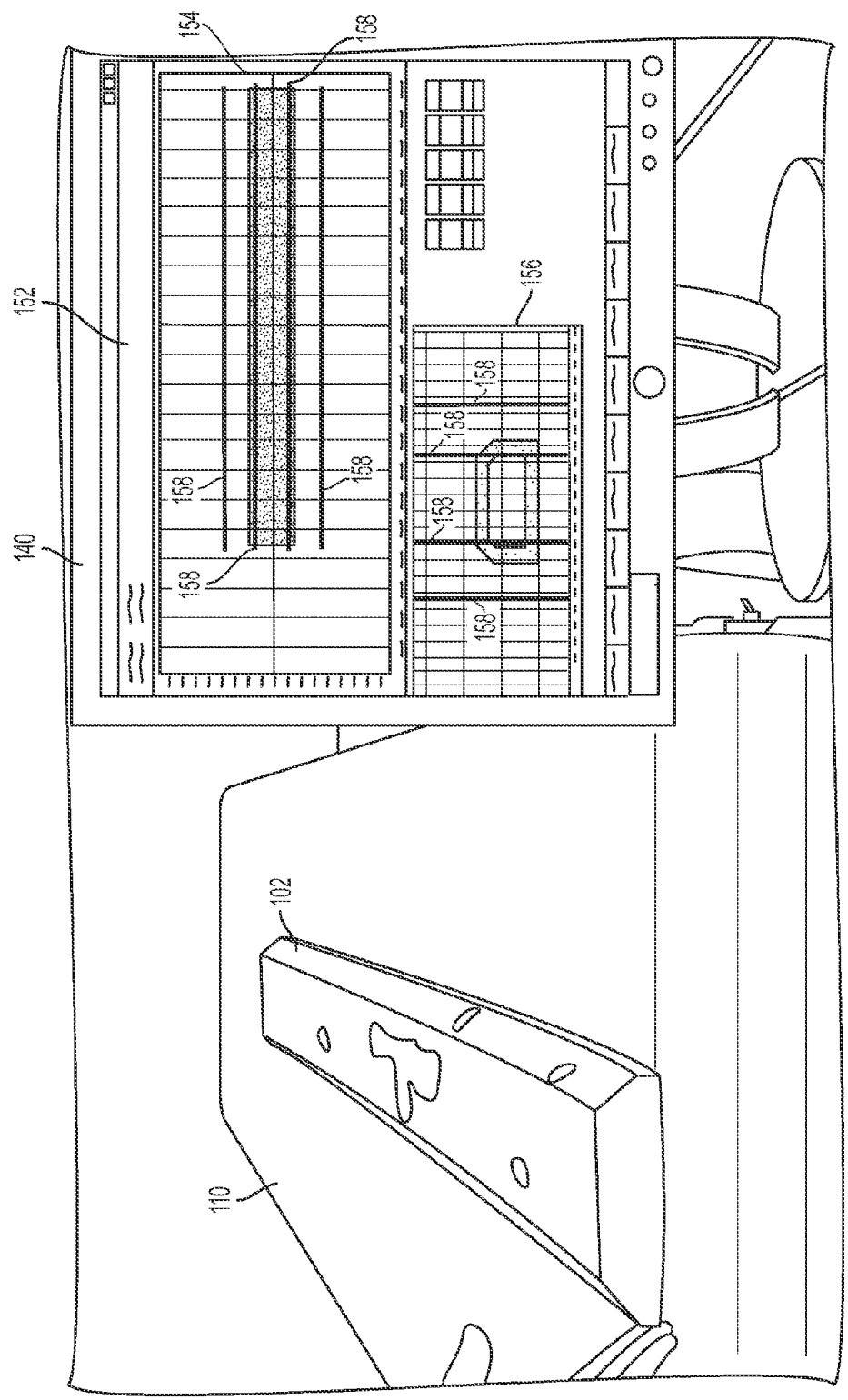
Figure 5:
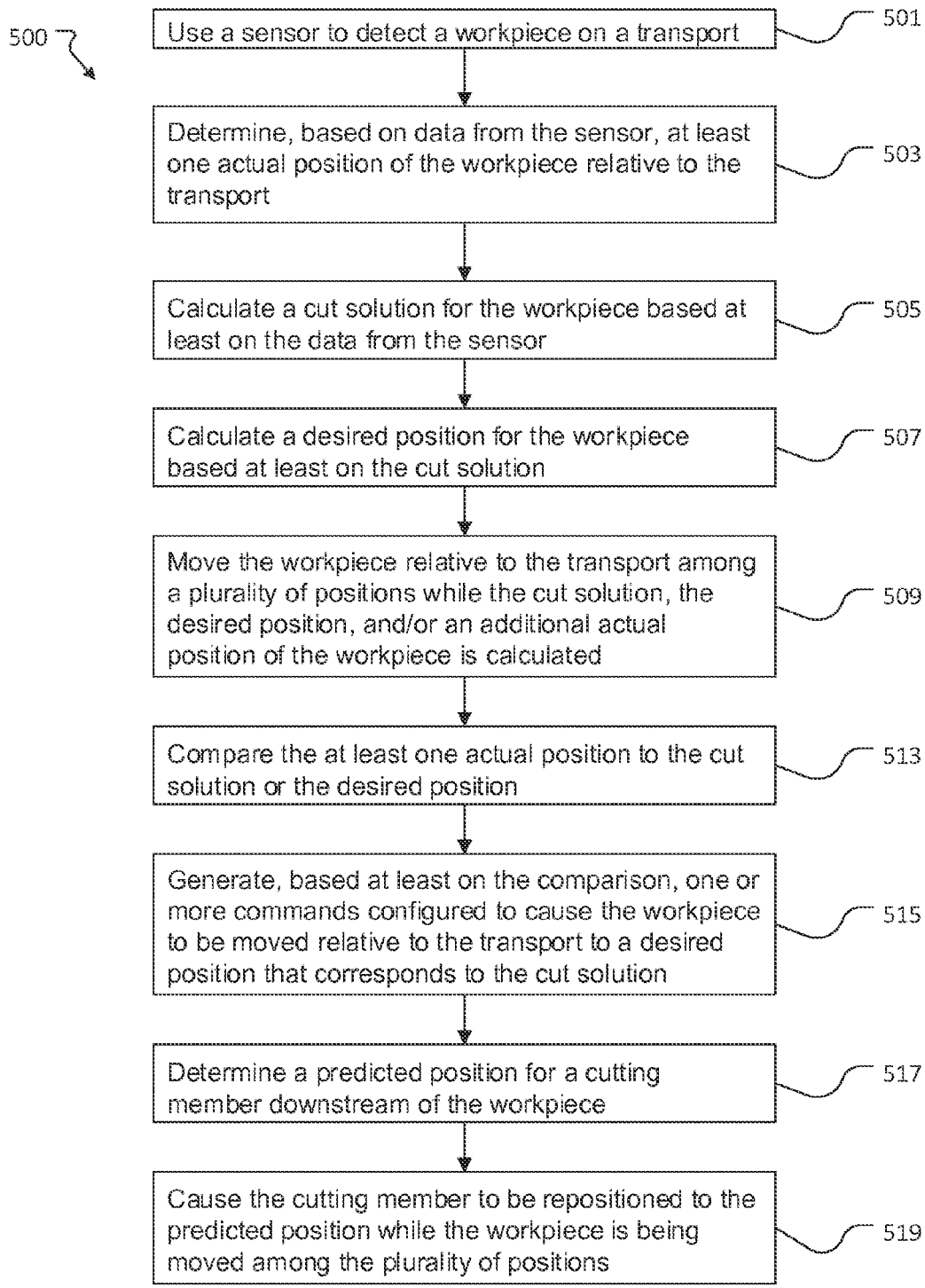
FIG. 5 illustrates a flow diagram of a method of positioning a workpiece.
Figure 6:
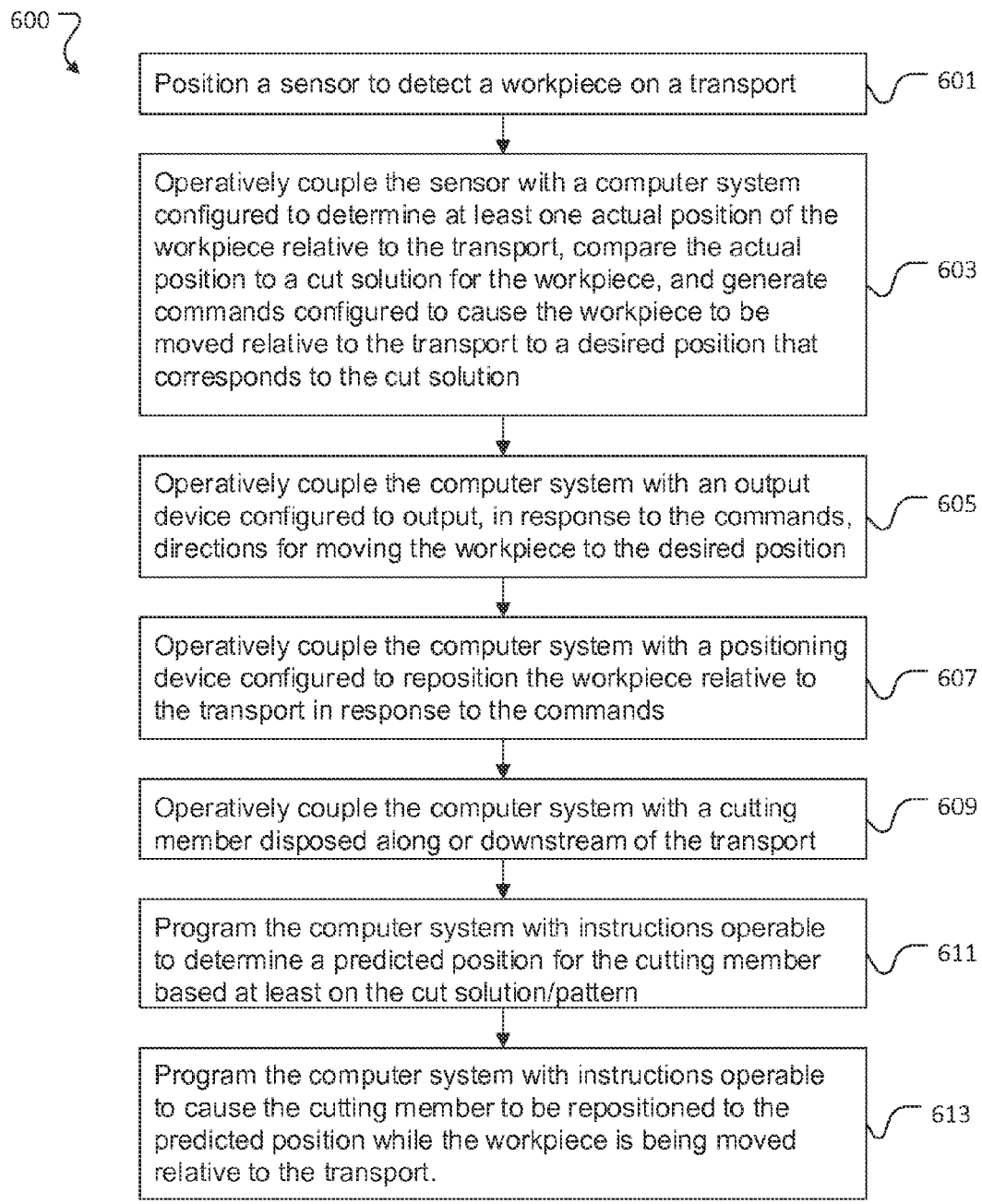
FIG. 6 illustrates a flow diagram of a method of modifying a workpiece processing system.

FIGS. 4A-4C illustrate an implementation of the workpiece positioning system, in accordance with various embodiments. In this example, transport 110 is an endless belt conveyor with an upper surface configured to support a workpiece 102. However, in other embodiments transport 110 can be a chain conveyor or other type of workpiece transport. Workpiece 102 can be a flitch, as shown in FIGS. 4-6. In other embodiments, workpiece 102 may be, but is not limited to, a log, a cant, a board, or the like.

In operation, workpiece 102 may be placed onto transport 110. A sensor (e.g., sensor 120, FIGS. 1-2) may be positioned overhead and configured to detect the workpiece on the transport. A computer system (e.g., computer system 130, FIGS. 1-2) may be operatively coupled to the sensor and to a display 142. The computer system may receive and analyze data from the sensor to determine an actual position of the workpiece on the transport. The computer system may also calculate a cut solution/pattern, determine a desired position for the workpiece, determine a predicted position of a downstream cutting member (e.g., cutting member 150, FIGS. 1-2), and/or perform other operations as described elsewhere herein. The computer system may send instructions to the display 140 based on these operations. In response, display 140 may display an image 152. In some embodiments, as shown for example in FIGS. 4-6, the computer system may generate a two-dimensional (2D) model and/or a three-dimensional (3D) model of the workpiece based on data from the sensor, and image 152 may include a representation of the 2D model and/or the 3D model.

Optionally, image 152 may include a plan view 154 and an end view 156 of the workpiece or model(s). Image 152 may also include one or more orientation features, such as lines, grids, units of measure, and the like, that have a fixed orientation relative to the transport. In some embodiments, image 152 may include a representation of a cut pattern, cut lines, and/or lines to indicate the position(s) of one or more downstream cutting members. For example, as shown in FIGS. 4-6, plan view 154 may show a longitudinal axis and a transverse axis of the transport, the 2D model of the workpiece oriented relative to the axes, and longitudinal orientation lines 158 that extend generally parallel to the a longitudinal axis of the 2D model. Similarly, end view 156 may include a horizontal line that represents the generally horizontal plane of the transport (i.e., the plane of the upper surface), a vertical line that represents a generally vertical plane that extends longitudinally through the transport, the 3D model of the workpiece oriented relative to the planes, and projected cut lines 158.

In some embodiments, the displayed image may include orientation marks configured to guide the human operator in moving the workpiece to the desired position. The positions of the models relative to the axes/planes may reflect the actual position of the workpiece on the transport, and the orientation marks may reflect the actual position of the workpiece relative to a desired position or other reference location (e.g., a position of a cutting member, a cut pattern, etc.). The positions of the models may change as the workpiece is moved relative to the transport. In some embodiments, the positions of the orientation marks may also change as the workpiece is moved. In other embodiments, the orientation marks may remain stationary. In still other embodiments, the orientation marks may change in position, size, number, and/or type to reflect corresponding changes in another parameter (e.g., cut solution/pattern, predicted position of cutting member).

In some embodiments, the orientation marks may be orientation lines. The orientation lines may indicate a target position (e.g., as a space between the orientation lines) or a direction in which the workpiece is to be moved. The alignment of the model with the orientation lines may indicate whether the workpiece is in the desired position. For example, the corresponding model may be shown centered between the orientation lines to indicate that the workpiece is in the desired position, such that a human operator can view the display and move the workpiece to align the models with the orientation lines. Alternatively, the orientation marks may indicate cut lines of a cut pattern and/or the positions of corresponding cut members.

In some embodiments, the positions of the orientation marks relative to the model may indicate projected cut lines. For example, in the illustrated example of FIGS. 4-6, plan view 154 includes four projected cut lines 158 shown relative to the 2D model, while end view 156 shows the four projected cut lines 158 relative to the 3D model. The positions of these projected cut lines may be moved/adjusted relative to the model(s) as the workpiece is moved relative to transport 110. Likewise, the positions of corresponding cutting members 150 may be automatically adjusted to track the positions of the projected cut lines, or vice versa. Optionally, a light, sound, or other signal may be provided when the workpiece is at or near the desired position relative to transport 110. The system of FIGS. 4-6 and the accompanying description is provided merely by way of example, and many variations in the types, numbers, and arrangements of visual displays, images, models, and orientation marks are possible. As such alternatives will be readily appreciable to skilled artisans in possession of the present disclosure, they will not be discussed further herein.

In some embodiments, sensor 120 and computer system 130 may be collectively configured to scan and optimize the workpiece discontinuously. For example, computer system 130 may be configured to determine the actual position of the workpiece on the transport, determine a difference between the actual position and the desired position, generate instructions for a corrective action to offset or reduce the difference, and determine a result of the corrective action. Computer system 130 may be configured to repeat the process after the corrective action, taking into account the result of the corrective action, until the actual position of the workpiece matches the desired position within predefined limits. The predefined limits may be entered by a user (e.g., a human operator), or computer system 130 may be programmed with one or more standard sets of limits. The predefined limits may define an acceptable range(s) of positional error(s) (e.g., deviation from a desired skew angle or slew distance). Alternatively, the predefined limits may define an acceptable range(s) of products to be cut from the workpiece.

In other embodiments, sensor 120 and computer system 130 may be collectively configured to scan and optimize the workpiece continuously while the workpiece is being repositioned on the transport within the field of view of the sensor. Computer system 130 may also be configured to calculate/modify a cut solution or cut pattern for the workpiece continuously while the workpiece is being repositioned on the transport. Computer system 130 may be configured to direct a human operator or a controller/positioning mechanism to move the workpiece toward the desired position until the desired position is reached within predefined limits. Alternatively, sensor 120 and computer system 130 may be collectively configured to monitor the changing position of the workpiece while a human operator moves the workpiece relative to the transport, and to provide an indication to the human operator when the workpiece is in a position that corresponds to the cut solution/pattern.

In a particular embodiment, a human operator may load a workpiece onto transport 110 (e.g., from a conveyor or bin). Optionally, the human operator may also press a grade button. Once the workpiece is on transport 110, the workpiece is scanned continuously by sensor 120 (in this embodiment, a series of laser sensors arranged at intervals along a flow direction above transport 110). Based at least in part on data received from the sensor 120, computer system 130 generates instructions to an output device (e.g., a speaker, display, projector, one or more lights) to output directions to the human operator to skew the end of the workpiece to the left or the right, and when to stop moving the workpiece. The directions include displayed/projected lines that indicate cut lines of a cut solution for the workpiece, the positions of corresponding cutting members 150, or both. As the workpiece is being moved by the human operator, the sensor 120 continues to scan the workpiece and the computer system 130 continues to recalculate or modify the cut solution based on the additional data from the sensor 120. The computer system causes the cutting member(s) and displayed/projected lines 158 to be repositioned in real time to follow the current cut solution.

The cut solution and/or saw lines are visible to the human operator, and the system includes an input device (e.g., a joystick, buttons, a pedal) operable by the human operator to manually adjust the laser lines/cutting members to maximize the value of the workpiece based on visual defects, clear wood, a split, or other workpiece attributes. Once the workpiece is aligned with the current cut solution, the computer system 130 causes the same or different output device to signal the human operator to stop repositioning the workpiece (e.g., a green light, a particular sound), at which time the saws have already been positioned to cut the workpiece according to the current cut solution.

The human operator then uses a manual input (e.g., a button or foot-operated switch) to cause transport 110 to move the workpiece toward the cutting members 150. As the workpiece moves forward, it is scanned again to fill in the areas between the 6" scan lines. Based on the additional information, the computer system 130 may determine, after the workpiece has been moved to a final position on transport 110, that the desired position and/or the cut pattern should be modified (e.g., to avoid a newly detected defect on the workpiece). The computer system may calculate a corrective action, such as an adjustment to the position of the cutting member(s) 150 and/or a modification to the cut solution to allow the workpiece to be cut according to the cut solution or modified cut solution without further repositioning of the workpiece.

This and other embodiments described herein may provide a cost-effective way to replace or upgrade a manual edger or gang saw in a tight footprint without compromising recovery or sawing accuracy. Embodiments that rely on positioning by a human operator may provide piece rates of 12 ppm or more while reducing variability in results among different human operators. Embodiments that include mechanical (non-human) positioners operable to automatically reposition workpieces may provide even higher piece rates.

FIG. 5 illustrates a flow diagram of a method of positioning a workpiece, in accordance with various embodiments. While the blocks are shown in a particular order by way of example, it is to be understood that in various embodiments the corresponding actions/processes may be performed in any order and/or any suitable number of times. Therefore, the order and number of actions/processes is not intended to be limiting.

Method 500 may begin at block 501. At block 501, a sensor (e.g., sensor 120) may be used to detect a workpiece (e.g., workpiece 102) on a transport (e.g., transport 110). In various embodiments, block 501 may include placing the workpiece on the transport within the field(s) of view of the sensor. For example, the workpiece may be placed on the transport by a positioner (e.g., positioner 160) or by a device such as a conveyor/transfer, a roller, or a drop-out gate. Data from the sensor may be received by a computer system (e.g., computer system 130).

Optionally, at block 503, the computer system may determine, based on the data from the sensor, at least one actual position of the workpiece relative to the transport. In some embodiments, the computer system and sensor may collectively detect the workpiece and determine actual positions of the workpiece continuously while the workpiece is moved relative to the transport. In other embodiments, block 503 may be omitted and the method may proceed from block 501 to block 505.

Optionally, at block 505, the computer system may calculate a cut solution for the workpiece based on the sensor data. In some embodiments, at block 505 the computer system may also calculate one or more cut patterns for the workpiece based on the cut solution. Skilled artisans will readily understand that some cut solutions may have several corresponding cut patterns, each suitable for cutting the workpiece according to the cut solution. Alternatively, the computer system may receive a pre-calculated cut solution/pattern from another computer or a cut solution/pattern input by a human operator. In some embodiments, the computer system may calculate a cut solution based on the sensor data and input by a human operator (e.g., a desired product) and/or other information stored or received by the computer system (e.g., economic values of various products, wood species, cut solution/pattern of preceding workpiece).

Optionally, at block 507, the computer system may calculate a desired position for the workpiece based at least on the cut solution/pattern. The desired position may be a position in which the workpiece is aligned with an actual or predicted position of a downstream cutting device, such that moving the workpiece in that position through the cutting device allows the workpiece to be cut according to the cut solution/pattern. In other embodiments, the computer system may modify the cut solution/pattern (or calculate a new cut solution/pattern) for the workpiece based on the actual position.

Optionally, at block 509, the workpiece may be moved relative to the transport among a plurality of positions. In some embodiments, the workpiece may be moved while the computer system calculates or recalculates the cut solution/pattern, the desired position, and/or the actual position of the workpiece. In some embodiments, the sensor may continue to detect the position of the workpiece while the workpiece is moved. The computer system may continue to receive data from the sensor, determine the additional positions of the workpiece, and recalculate or modify the cut solution/pattern or the desired position as the workpiece is being moved (e.g., by a human operator or a positioning device, e.g., positioner 160). In other embodiments, the computer system may calculate a cut solution/pattern for the workpiece before determining an actual position of the workpiece. Optionally, the computer system may also determine a preferred position for the workpiece based at least on the cut solution/pattern before determining the actual position of the workpiece.

At block 513, the computer system may compare the actual position to the cut solution/pattern or the desired position. For example, the sensor may capture an image of the workpiece on the transport, and the computer system may compare the actual position to a desired position by finding the edges of the workpiece in the image, determining the locations of the edges that correspond to the desired position, and calculating the difference in distance/angle between the actual location of the edges and the locations that correspond to the desired position. Alternatively, the computer system may compare the actual location of one or more reference points along the workpiece (e.g., center, corners, ends, sides, outer edges) to expected locations of those reference points in the desired position, and calculate the differences in distance/angle between the actual locations of the reference points and the desired positions of the reference points.

At block 515, the computer system may generate, based at least on the comparison, one or more commands configured to cause the workpiece to be moved relative to the transport to a desired position that corresponds to the cut solution. In some embodiments, the command(s) may be configured to cause an output device (e.g., output device 140; display 142, speaker 144, and/or projector 146) to provide instructions to a human operator for moving the workpiece to the desired position. In other embodiments, the output device may include a controller, and the command(s) may be configured to cause the controller to operate a positioning device to move the workpiece to the desired position.

In some embodiments, the workpiece may be moved relative to the transport. While the workpiece is being moved (or after the workpiece has been moved) the method may return to block 501 and the sensor may detect the workpiece again. Some or all of blocks 503 to 515 may be repeated until the workpiece has been moved to the desired position, or approximately the desired position. Thus, in some embodiments, as the sensor continues to detect the workpiece, the computer system may continue to re-optimize the workpiece based on data from the sensor and to direct the repositioning of the workpiece in an iterative manner until the workpiece has been moved to the desired position (e.g., within an acceptable margin of error).

In some embodiments, the workpiece may be turned over, advanced in the direction of flow, and/or moved in the opposite direction, such that a surface or surface portion of the workpiece becomes newly detectable by the sensor. This additional information from the sensor may allow the computer system to calculate a more desirable cut solution/pattern for the workpiece. For example, turning the workpiece over may reveal a defect (e.g., a knot, wane, a stain, a crack) that was not detected on the side that was initially scanned. As another example, the sensor may include one or more lineal scanners positioned to detect corresponding one or more portions of the workpiece, and moving the workpiece forward or backward relative to the direction of flow may allow the lineal scanner(s) to detect a previously undetected portion of the workpiece. Regardless, based on the additional information from the sensor, the computer may recalculate or modify the cut solution/pattern (e.g., to reduce or eliminate a newly detected defect from the predicted cut product). The computer may then recalculate or modify the desired position in accordance with the new or modified cut solution/pattern.

Optionally, at block 517, the computer system may determine a predicted position for a cutting member (e.g., cutting member 150) downstream of the workpiece. The predicted position may be a starting position for the cutting member to cut the workpiece according to the cut solution/pattern. In some embodiments, the computer system may recalculate the predicted position as the actual position, desired position, or cut solution/pattern is recalculated or modified.

In some embodiments, at block 519 the computer system may cause the cutting member to be repositioned to the predicted position while the workpiece is being moved relative to the transport toward the desired position. Alternatively, the computer system may cause the cutting member to be repositioned to the predicted position after the workpiece has been moved to the desired position, while the workpiece is being moved in the direction of flow toward the cutting member by the transport. Pre-positioning the cutting member may reduce the time required to cut the workpiece according to the cut solution/pattern.

Optionally, in some embodiments the sensor and computer system may continue to collectively detect the workpiece and recalculate/modify the cut solution/pattern as the workpiece is advanced toward the cutting member on the transport. For example, the sensor may be one or more line scanners spaced apart above the transport in the direction of flow. The sensor may have a field of view that includes only part of the surface of the workpiece while the workpiece is being moved toward the desired position. However, once the workpiece is has been placed into approximately the desired position and is being advanced toward the cutting member, the sensor may detect some or all of the previously undetected portions of the workpiece. The computer system may recalculate/modify the cut solution/pattern for the workpiece based on the information about those portions of the workpiece, and may adjust the position of the cutting member accordingly.

FIG. 6 illustrates a flow diagram of a method of modifying a workpiece processing system, in accordance with various embodiments. Again, while the blocks are shown in a particular order by way of example, it is to be understood that in various embodiments the corresponding actions/processes may be performed in any order and/or any suitable number of times. Therefore, the order and number of actions/processes is not intended to be limiting.

Method 600 may begin at block 601. At block 601, a sensor (e.g., sensor 120) may be positioned to detect a workpiece (e.g., workpiece 102) on a transport (e.g., transport 110). In some embodiments, the sensor may be positioned above the transport. In other embodiments, the sensor may be positioned below or to at least one side of the transport. In various embodiments, the sensor may include a plurality of sensors positioned in different locations. For example, in one embodiment the sensor may include several line scanners positioned at intervals above the transport.

At block 603, the sensor may be operatively coupled with a computer system (e.g., computer system 130). The computer system may be configured to determine at least one actual position of the workpiece relative to the transport, compare the actual position to a cut solution/pattern or desired position for the workpiece, and generate commands configured to cause the workpiece to be moved relative to the transport to a desired position that corresponds to the cut solution.

At block 605, the computer system may be operatively coupled with an output device configured to output, in response to the commands, directions for moving the workpiece to the desired position. The directions for moving the workpiece may be output as auditory or visual signals adapted to direct a human operator. Alternatively, the directions may be electronic commands to direct or control a mechanical positioner (e.g., one or more chains, a linebar, centering flights, skids, or the like) configured to controllably adjust the position of the workpiece. In some embodiments, the directions may include both electronic commands adapted to direct or control a mechanical positioner and auditory or visual signals adapted to guide a human operator. For example, the computer system may control the positioner, and the output device may output auditory or visual signals to allow a human operator to manually adjust operations of the positioner and/or verify that the workpiece is correctly positioned.

Optionally, at block 607, the computer system may be operatively coupled with a positioning device (e.g., positioner 160). For example, the computer system may be operatively coupled with the output device (e.g., a PLC) at block 605, and the output device may be operatively coupled with the positioning device at block 607. The positioning device may be configured to reposition the workpiece relative to the transport in response to the commands from the computer system or the output device.

Other embodiments may lack block 607. For example, the output device may be configured to output an image or an auditory signal to direct a human operator to move the workpiece to the desired position. In some embodiments, the output device may include a display (e.g., display 142), a speaker (e.g., speaker 144), and/or a projector (e.g., projector 146).

Optionally, at block 609, the computer system may be coupled with a cutting member (e.g., cutting member 150) disposed along or downstream of the transport.

Optionally, at block 611, the computer system may be programmed with instructions operable to determine a predicted position for the cutting member based at least on the cut solution/pattern. The predicted position may be a start position for the cutting member to cut the workpiece according to the cut solution/pattern. In various embodiments, the computer system may also be programmed to calculate the cut solution/pattern, the desired position for the workpiece, and/or the predicted position for the cutting member.

Optionally, at block 613, the computer system may be programmed with instructions operable to cause the cutting member to be repositioned to the predicted position while the workpiece is being moved relative to the transport. Alternatively, the computer system may be programmed with instructions operable to cause the cutting member to be repositioned to the predicted position while the workpiece is being moved by the transport in the flow direction toward the cutting member.

While the operations of methods 500 and 600 are illustrated in a particular order and appear only once in the corresponding Figures and description, it is to be understood that in various embodiments one or more of the operations may be repeated, omitted, and/or performed out of order.

Figure 7:
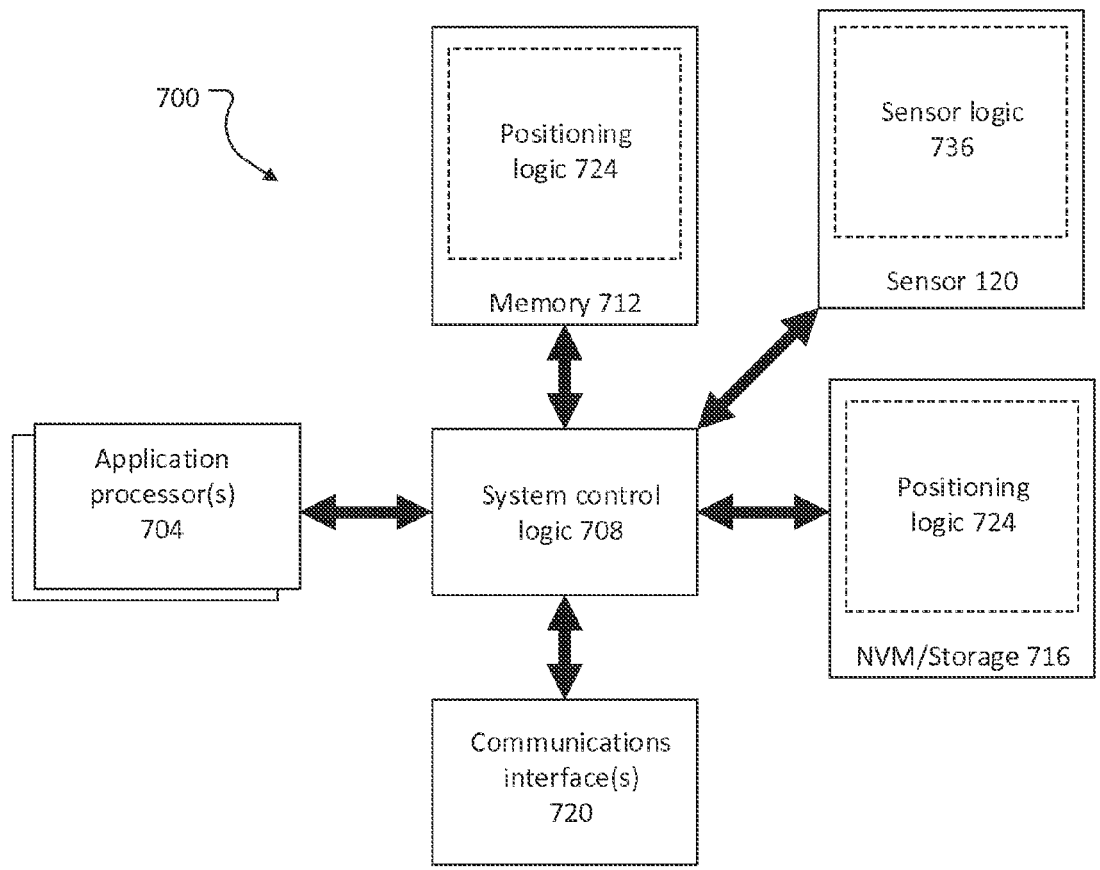
FIG. 7 is a schematic diagram of a computer system for implementing operations of a workpiece positioning system.

FIG. 7 illustrates an example of a computer system suitable for practicing embodiments of the present disclosure. In various embodiments, computer system 700 may have some or all of the features described herein with regard to computer system 130. Again, while the blocks are shown in a particular order by way of example, it is to be understood that in various embodiments the corresponding actions/processes may be performed in any order and/or any suitable number of times. Therefore, the order and number of actions/processes is not intended to be limiting.

As illustrated, computer system 700 may include system control logic 708 coupled to at least one of the processor(s) 704, memory 712 coupled to system control logic 708, non-volatile memory (NVM)/storage 716 coupled to system control logic 708, and one or more communications interface(s) 720 coupled to system control logic 708. In various embodiments, system control logic 708 may be operatively coupled with a sensor (e.g., sensor 120) and/or an output device (e.g., output device 140). In various embodiments the processor(s) 704 may be a processor core.

System control logic 708 may include any suitable interface controller(s) to provide for any suitable interface to at least one of the processor(s) 704 and/or any suitable device or component in communication with system control logic 708. System control logic 708 may also interoperate with the sensor and/or the output device. In various embodiments, the output device may include one or more of a display (e.g., display 142, FIGS. 1-2), a projector (e.g., projector 146, FIG. 3), and/or a speaker (e.g., speaker 144, FIGS. 1-2). In other embodiments, the output device may include a PLC>

System control logic 708 may include one or more memory controller(s) to provide an interface to memory 712. Memory 712 may be used to load and store data and/or instructions, for example, for various operations of workpiece positioning system 100. In one embodiment system memory 712 may include any suitable volatile memory, such as suitable dynamic random access memory ("DRAM").

System control logic 708, in one embodiment, may include one or more input/output ("I/O") controller(s) to provide an interface to NVM/storage 716 and communications interface(s) 720.

NVM/storage 716 may be used to store data and/or instructions, for example. NVM/storage 716 may include any suitable non-volatile memory, such as flash memory, for example, and/or any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 716 may include a storage resource that may physically be a part of a device on which computer system 700 is installed, or it may be accessible by, but not necessarily a part of, the device. For example, the NVM/storage 716 may be accessed over a network via the communications interface(s) 720.

System memory 712, NVM/storage 716, and/or system control logic 708 may include, in particular, temporal and persistent copies of positioning logic 724. The positioning logic 724 may include instructions operable, upon execution by at least one of the processor(s) 704, to cause computer system 700 to practice one or more aspects of operations described herein (e.g., creation of a dimensional model of a workpiece based on sensor data, calculation of one or more cut solutions, calculation of one or more cut patterns, determination of an actual workpiece position, determination of a desired workpiece position, determination of a predicted cutting member position, etc.).

Optionally, computer system 700 may include sensor 120 coupled with system control logic 708. Sensor 120 may include sensor logic 734. Sensor logic 734 may include instructions operable, upon execution by at least one of the processor(s) 704, to cause computer system 700 to practice one or more aspects of the processes described herein (e.g., detecting a workpiece, generation of sensor data, creation of a dimensional model based on sensor data, continuously detecting the workpiece, discontinuously detecting the workpiece, etc.).

Communications interface(s) 720 may provide an interface for computer system 700 to communicate over one or more network(s) and/or with any other suitable device. Communications interface(s) 720 may include any suitable hardware and/or firmware, such as a network adapter, one or more antennas, a wireless interface, and so forth. In various embodiments, communication interface(s) 720 may include an interface for computer system 700 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 704, memory 712, and so forth may vary. In various embodiments, computer system 700 may include, but is not limited to, a smart phone, a computing tablet, a laptop computer, a desktop computer, and/or a server. In various embodiments computer system 700 may be, but is not limited to, one or more servers known in the art.

In one embodiment, at least one of the processor(s) 704 may be packaged together with system control logic 708 and/or positioning logic 724. For example, at least one of the processor(s) 704 may be packaged together with system control logic 708 and/or positioning logic 724 to form a System in Package ("SiP"). In another embodiment, at least one of the processor(s) 704 may be integrated on the same die with system control logic 708 and/or positioning logic 624. For example, at least one of the processor(s) 704 may be integrated on the same die with system control logic 708 and/or positioning logic 624 to form a System on Chip ("SoC").

Figure 8:
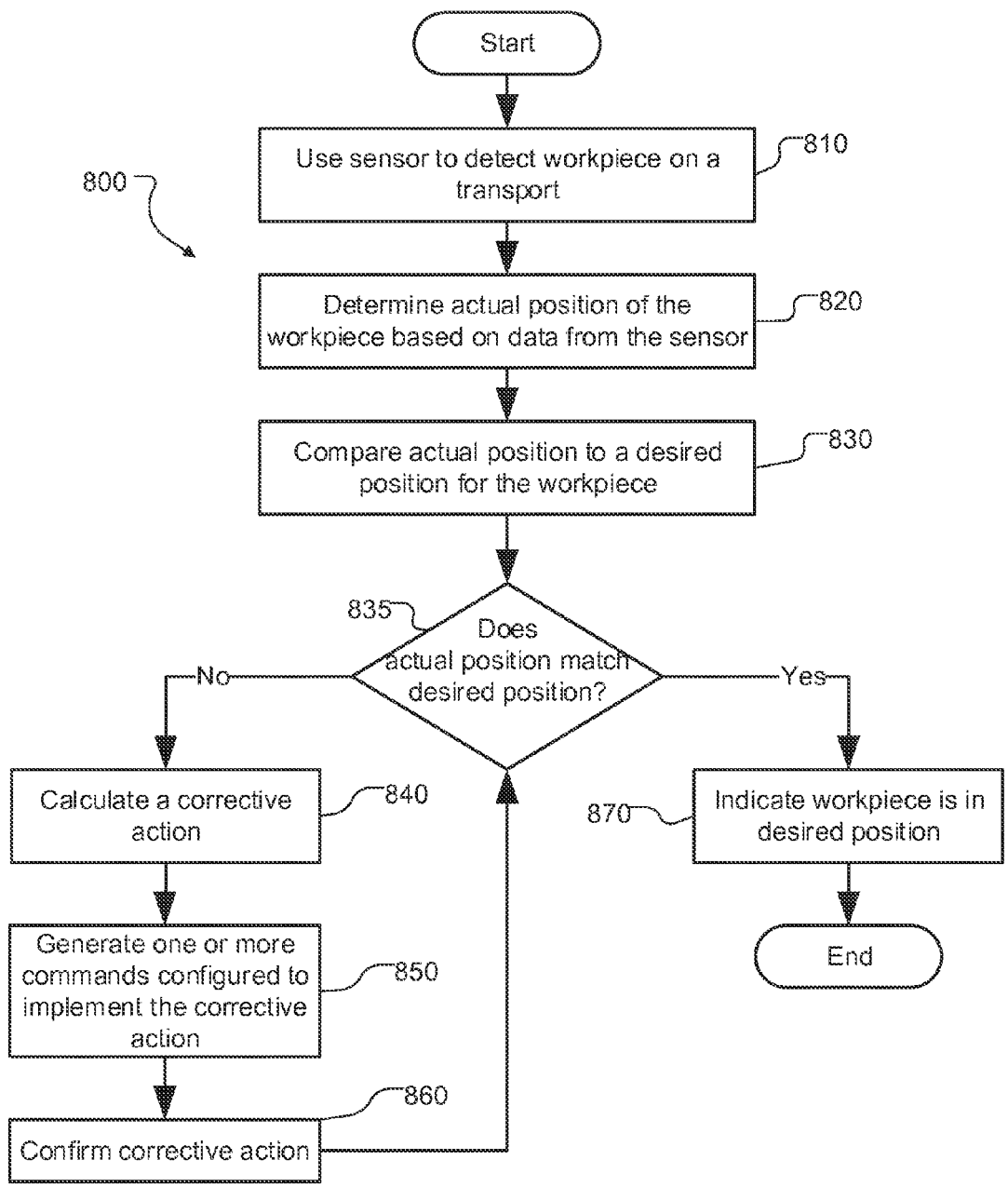
FIG. 8 is a flow chart of an example workpiece positioning process of a positioning system.

FIG. 8 illustrates a workpiece positioning process 800 of a positioning system (e.g., positioning system 100), in accordance with various embodiments. While the operations of process 800 are arranged in a particular order and illustrated once each, in various embodiments one or more of the operations may be repeated, omitted, or performed out of order.

The process 800 may begin at operation 810. At operation 810, a sensor, such as sensor 120, may be used to detect a workpiece on a transport (e.g., transport 110). Next, at operation 820 a computer system (e.g., computer system 130) operatively coupled with the sensor may determine an actual position of the workpiece based on data from the sensor. In some embodiments, operation 820 may proceed generally as described below with reference to process 900 of FIG. 9.

At operation 830 the computer system may compare the actual position to a desired position for the workpiece. In some embodiments, operation 830 may proceed generally as described below with reference to process 1000 of FIG. 10.

Next, at operation 835 the computer system may determine whether the actual position matches the desired position. In some embodiments, the actual position may "match" the desired position if the actual position deviates from the desired position by a percentage of error that is within one or more predetermined limits. The predetermined limit(s) may be stored on the computer system and/or input by a human operator.

If the computer system determines at block 835 that the actual position matches the desired position, the process 800 may proceed to operation 870. At operation 870, the computer system may indicate that the workpiece is in the desired position. For example, the computer system may generate one or more commands to cause a positioning device (e.g., positioner 160) to release the workpiece and/or cease repositioning of the workpiece. Alternatively, the computer system may generate one or more commands to cause a display (e.g., display 142), a speaker (e.g., speaker 144), and/or a projector (e.g., projector 146) to output to a human operator an indication that the workpiece is in the desired position.

If the computer system determines at operation 835 that the actual position does not match the desired position (e.g., the difference exceeds the predetermined limit(s)), the process 800 may proceed to operation 840. At operation 840, the computer system may calculate a corrective action. The corrective action may include, but is not limited to, an adjustment to a position of the cutting member to offset the difference, a modification to the cut pattern or cut solution to offset the difference, and/or an adjustment to the actual position of the workpiece to reduce the difference. In some embodiments, operation 840 may proceed generally as described below with reference to process 1100 of FIG. 11.

At operation 850 the computer system generate one or more commands configured to implement the corrective action. For example, the computer system may generate one or more commands configured to cause a controller/PLC to reposition the workpiece and/or the cutting member. Alternatively, the computer system may generate one or more commands configured to cause an output device (e.g., output device 140) to output visual and/or auditory directions to a human operator for repositioning the workpiece.

Next, at operation 860 the computer system may confirm the corrective action. In some embodiments, operation 860 may proceed generally as described below with reference to process 1200 of FIG. 12.

The process 800 may then return to operation 835. If the computer system determines again that the actual position does not match the desired position, the process may proceed to operation 840, and the sequence of operations 840, 850, 860, and 835 may be repeated until the computer system determines that the actual position matches the desired position. The process 800 may then proceed to operation 870, after which the process may end.

Figure 9:
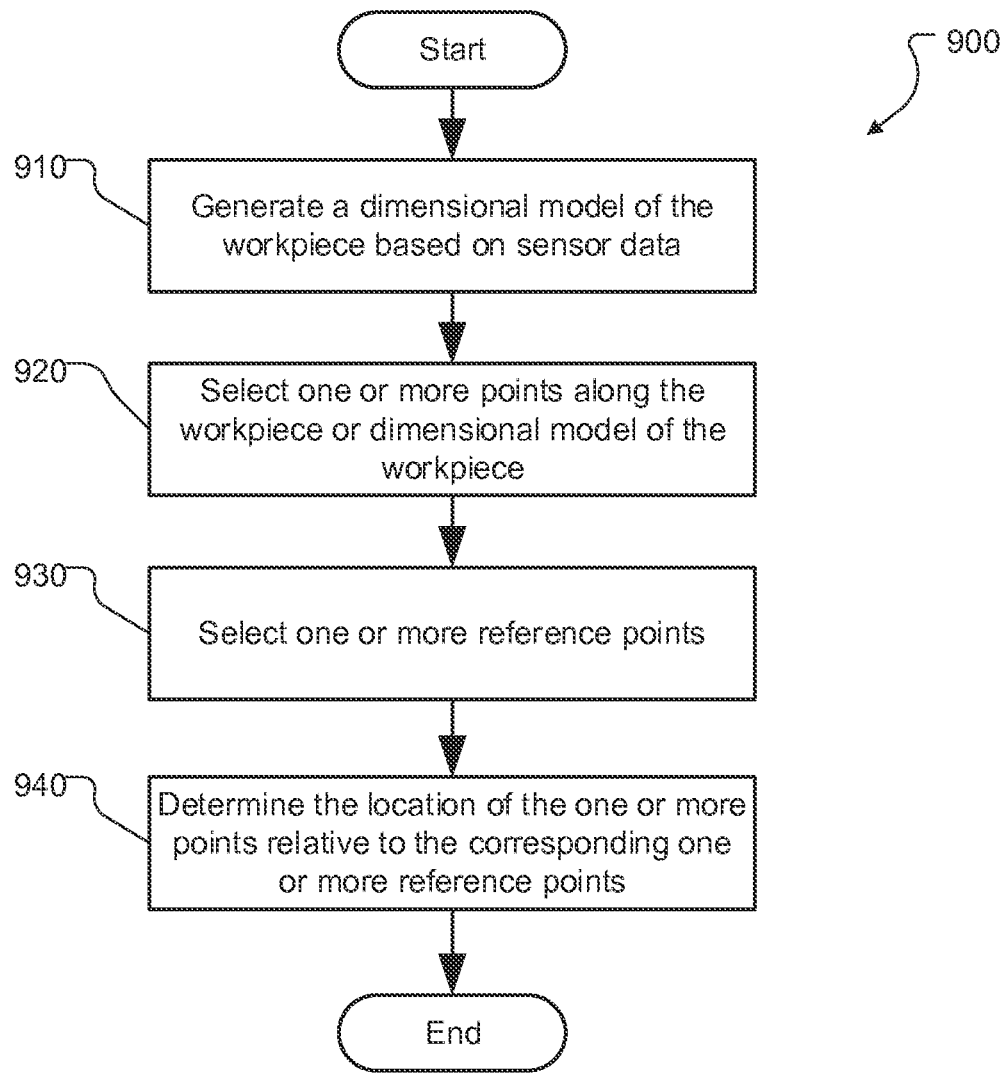
FIG. 9 is a flow chart of an example position determination process.

FIG. 9 is a flow chart of an example position determination process 900, in accordance with various embodiments. In various embodiments process 900 may include one or more embodiments of operation 820 of process 800. While the operations of process 900 are shown arranged in a particular order with each of the operations illustrated only once, it is to be understood that in various embodiments one or more of the operations may be repeated, omitted, or performed out of order.

Optionally, the process 900 may begin at operation 910. At operation 910, the computer system (e.g., computer system 130) may generate one or more dimensional models of the workpiece based on the sensor data. Alternatively, the computer system may generate the dimensional model(s) of the workpiece based on data from another sensor upstream of the transport (e.g., a scanner positioned along an upstream conveyor). The dimensional models may include a 2D model and/or a 3D model of the workpiece. FIG. 13A illustrates a schematic diagram of a 2D model 1302 of a workpiece, in accordance with various embodiments.

Alternatively, in some embodiments operation 910 may be omitted, and the process 900 may begin at operation 920. For example, the computer system may receive the dimensional model(s) from another computer/database. Alternatively, the computer system may use a 2D image of the workpiece in lieu of a dimensional model.

Next, at operation 920 the computer system may select one or more points along the workpiece and/or along the dimensional model(s) of the workpiece. Examples of such points include, but are not limited to, a geometric center of the workpiece, point(s) along a longitudinal centerline of the workpiece, point(s) along a transverse centerline of the workpiece, point(s) along the edges/corners of the workpiece, and/or point(s) corresponding to one or more workpiece defects.

Next, at operation 930 the computer system may select one or more reference points. In various embodiments, the reference point(s) may include, but are not limited to, a point at a geometric center of the transport, point(s) along a longitudinal centerline of the transport, point(s) along a transverse centerline of the transport, point(s) along the edges/corners of the corners of the transport, point(s) along a trajectory of the cutting member, and/or point(s) corresponding to a predicted position of the cutting member.

Next, at operation 940 the computer system may determine the location of the one or more points along the workpiece/dimensional model(s) relative to the corresponding one or more reference points. For example, in one embodiment, the computer system may determine the distance between a reference point (e.g., the geometric center of the transport) and a point located at the geometric center of the workpiece. The points selected along the workpiece/model and the reference points may vary among embodiments. After operation 940, the process may end.

Figure 10:
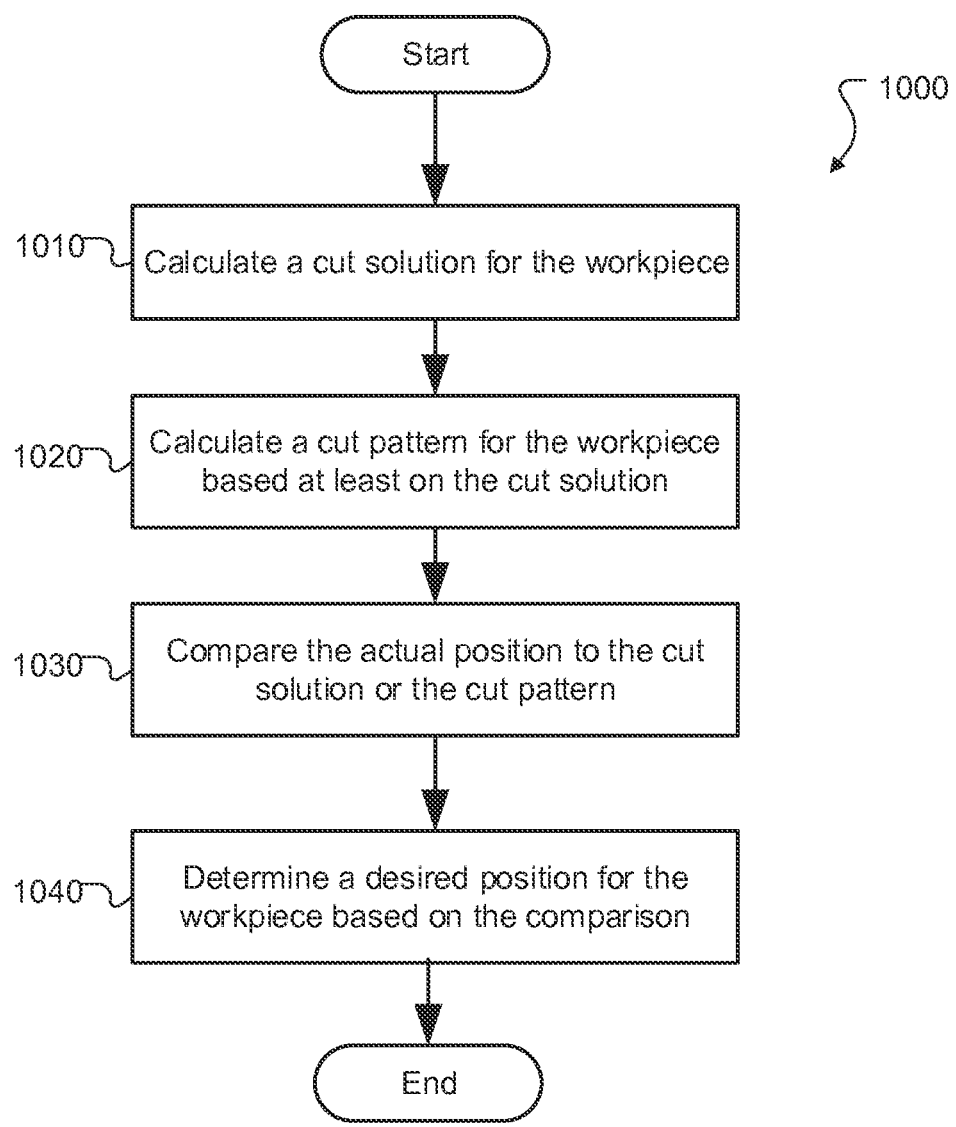
FIG. 10 is a flow chart of an example position comparison process.

FIG. 10 is a flow chart of an example position comparison process 1000, in accordance with various embodiments. In various embodiments process 1000 may include one or more embodiments of operation 840 of process 800. While the operations of process 1000 are shown arranged in a particular order with each of the operations illustrated only once, it is to be understood that in various embodiments one or more of the operations may be repeated, omitted, or performed out of order.

Optionally, the process may begin at operation 1010. At operation 1010, the computer system may calculate a cut solution for the workpiece. The computer system may calculate the cut solution based on data from the sensor. In some embodiments, the computer system may calculate the cut solution based at least in part on input from a human operator (e.g., a desired product) and/or information stored on, or retrieved by, the computer system (e.g., economic values of products, cost of the workpiece, constraints of the cutting member, workpiece defects, etc.). In other embodiments, the computer system may calculate the cut solution based on data from another sensor positioned upstream of the transport. By way of example, FIG. 13B illustrates a schematic diagram of a cut solution that defines two products 1306a and 1306b to be cut from the workpiece. In other embodiments, the computer system may receive a cut solution from another computer or as input, and block 1010 may be omitted.

Optionally, at operation 1020, the computer system may calculate a cut pattern for the workpiece based at least on the cut solution. In some embodiments, the computer system may calculate a plurality of cut patterns for the workpiece based at least in part on actual positions of the workpiece. In other embodiments, the computer system may calculate the cut pattern for the workpiece based at least in part on input from a human operator (e.g., a desired product) and/or information stored on, or retrieved by, the computer system (e.g., workpiece defects, a cut solution/pattern of a preceding workpiece, constraints of the cutting member, etc.). Alternatively, the computer system may receive a cut pattern from another computer or as input, and block 1020 may be omitted. FIGS. 13C and 13D illustrate examples of two possible cut patterns 1314 (shown in dashed lines) for the dimensional model/workpiece 1302 illustrated in FIG. 13A and the cut solution illustrated in FIG. 13B.

At operation 1030, the computer system may compare the actual position of the workpiece to the cut solution or the cut pattern. For example, in some embodiments the computer system may calculate one or more cut lines that correspond to the cut solution/pattern. For each cut line, the computer system may determine a predicted location of the cut line relative to the transport (e.g., transport 110) and/or corresponding cutting member (e.g., cutting member 150) and a desired location of the cut line along the workpiece/dimensional model. The computer system may then compare the predicted location to the desired location to determine any differences in distance/orientation/angle.

Optionally, at operation 1040, the computer system may determine a desired position for the workpiece based on the comparison. For example, the computer system may determine a location for the workpiece at which the desired location(s) of the cut lines along the workpiece/dimensional model overlap the predicted location(s) of the cut line(s) relative to the transport. Alternatively, the computer system may determine a range of locations for the workpiece at which the predicted location(s) of the cut line(s) relative to the transport would substantially overlap the workpiece/dimensional model, such that the cut lines fall within the outer periphery of the workpiece/dimensional model. After operation 1030/1040, the process 1000 may end.

Figure 11:
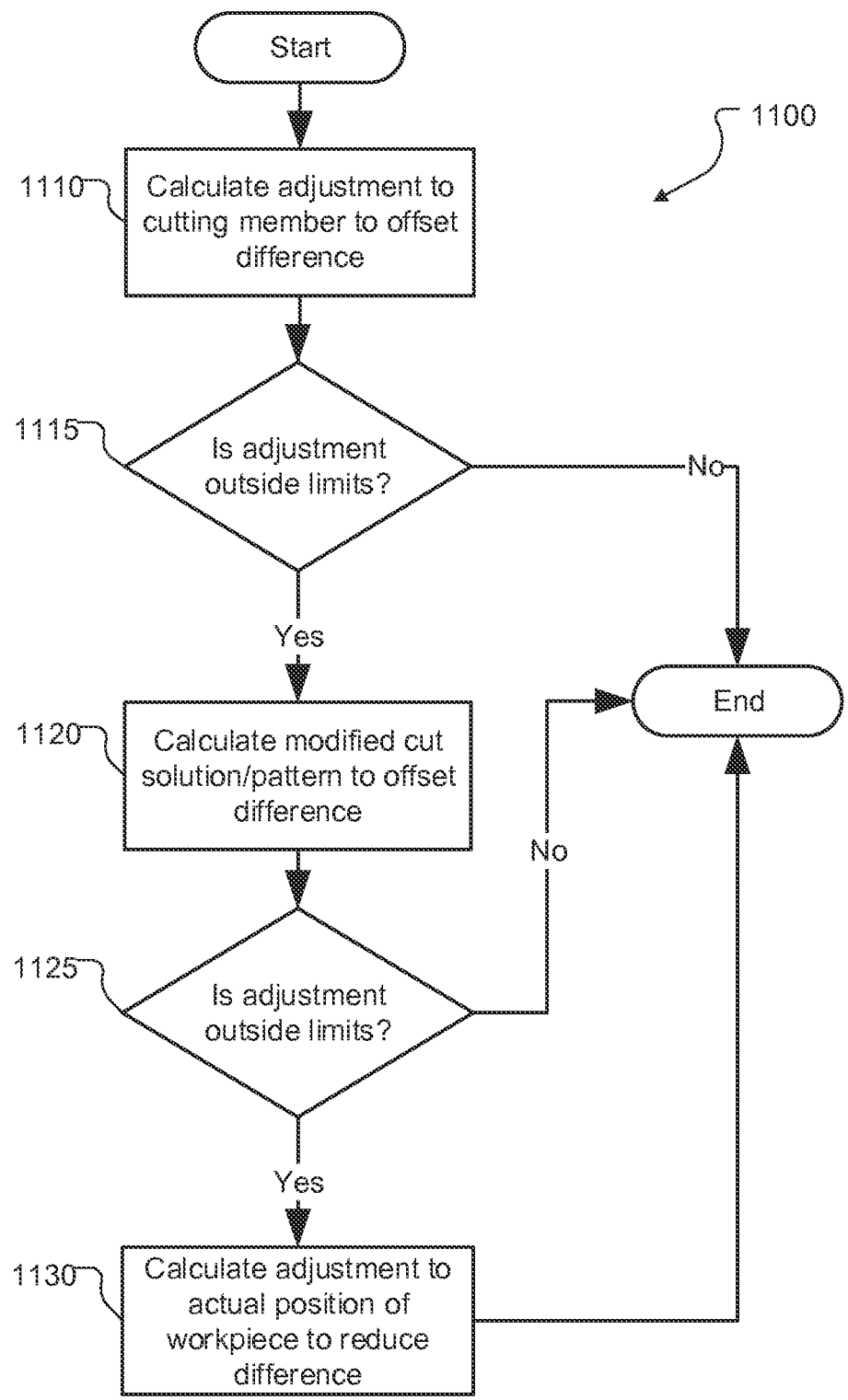
FIG. 11 is a flow chart of an example corrective action determination process.

FIG. 11 is a flow chart of an example corrective action determination process 1100, in accordance with various embodiments. In various embodiments process 1100 may include one or more embodiments of operation 850 of process 800. While the operations of process 1100 are shown arranged in a particular order with each of the operations illustrated only once, it is to be understood that in various embodiments one or more of the operations may be repeated, omitted, or performed out of order.

The process 1100 may begin at operation 1110. At operation 1110, the computer system may calculate an adjustment to a cutting member (e.g., cutting member 150) to offset a difference between the actual position of the workpiece and the desired position of the workpiece. Optionally, the adjustment may be an adjustment to a skew/slew position that would allow the workpiece to be cut according to the cut solution/pattern without further repositioning of the workpiece. In some embodiments, the computer system may calculate the positional error (e.g., the difference between the actual position of the workpiece and the desired position of the workpiece). The positional error can include, for example, a difference in skew angle, a difference in lateral position (e.g., relative to a lateral edge of the transport), and/or a difference in axial position (e.g., relative to an upstream or downstream end of the transport) between the actual position of the workpiece and the desired position of the workpiece. The computer system may then determine an adjustment to the cutting member that would reduce or eliminate the positional error (e.g., that would reduce the positional error to within an acceptable range of error). In various embodiments, the computer system may determine whether the positional error can be reduced to within an acceptable range of error by shifting or otherwise repositioning the cutting member to a different start position (e.g., one inch to the left). In response to a determination that the positional error cannot be reduced to within the acceptable range of error by adjusting the start position of the cutting members, the computer system may determine whether the positional error can be reduced to within the acceptable range of error by slewing the cutting member while the cutting member engages the workpiece, to thereby impart a slight skew angle to the cutting member as discussed further below with regard to FIGS. 14 and 15A-D.

Next, at operation 1115 the computer system may determine whether the adjustment to the cutting member is within the limits of the cutting member. This determination may be based at least in part on stored or retrieved information about various constraints of the cutting member. For example, in some embodiments the computer system may be programmed with information about the slew range of the cutting member and/or the skew range of the cutting member. Thus, the computer system may determine that an adjustment to the cutting member that would require skewing/slewing of the cutting member beyond the given range(s) is outside the limits of the cutting member. Similarly, the computer system may determine that an adjustment to the cutting member that would require slewing/slewing of the cutting member within the given range(s) is not outside the limits of the cutting member. In some embodiments, the computer system may determine an adjustment to the position of the cutting member relative to the workpiece that would allow a greater skew angle to be imparted to the cutting member by skewing. For example, as discussed below with reference to FIGS. 14 and 15A-D, the computer system may determine that repositioning the cutting member to reduce the length of the cutting member within the cut may allow the cutting member to be skewed by up to another 1-2 degrees by slewing. The computer system may determine whether the adjustment(s) to the position and/or operation of the cutting member are within the limits of the cutting member, and whether they are sufficient to allow the workpiece to be cut according to the desired cut solution/pattern.

If the computer system determines at operation 1115 that the adjustment to the cutting member is within the limits of the cutting member, the process 1100 may end. However, if the computer system determines at operation 1115 that the adjustment is outside the limits of the cutting member, the process 1100 may proceed to operation 1120. In some embodiments, operations 1110 and/or 115 may be omitted, and process 1100 may begin at block 1120.

In operation 1120, the computer system may calculate a modified cut solution/pattern to offset the positional error. Optionally, the modification may be an adjustment to the cut solution/pattern that would allow the workpiece to be cut according to the modified cut solution/pattern without further repositioning of the workpiece. For example, the computer system may determine a modification to a lead-in or lead-out portion of a cut pattern along an end of the workpiece that will be trimmed away further downstream. Alternatively, the modification may be a new or recalculated cut solution/pattern that yields the same products or different products than the prior cut solution. For example, the modification may be a new cut pattern based on the same cut solution, but with the cut lines arranged, oriented, and/or angled differently than in the previous cut pattern. FIG. 13E illustrates an example of a modification to a cut pattern in which the skew angle of the cut lines of a prior cut pattern (i.e., the cut pattern of FIG. 13D) has been modified relative to the dimensional model/workpiece 1302.

In operation 1125, the computer system may determine whether the adjustment is outside predefined limits. In various embodiments, the limits may include an acceptable range of positional error, an acceptable range of products and/or economic yield from the workpiece, and/or limits of the cutting member as generally described above. If the computer system determines in operation 1125 that the adjustment is not outside the limits, the process 1100 may end.

However, the computer system determines in operation 1125 that the adjustment is outside the limits, the process 1100 may proceed to operation 1130. At operation 1130, the computer system may calculate an adjustment to the skew angle and/or the lateral or axial position of the workpiece. For example, the computer system may determine, based on the positional error, that the workpiece should be moved axially/laterally or rotated/skewed in a particular direction to a given distance/angle. After operation 1125, process 1100 may end.

Figure 12:
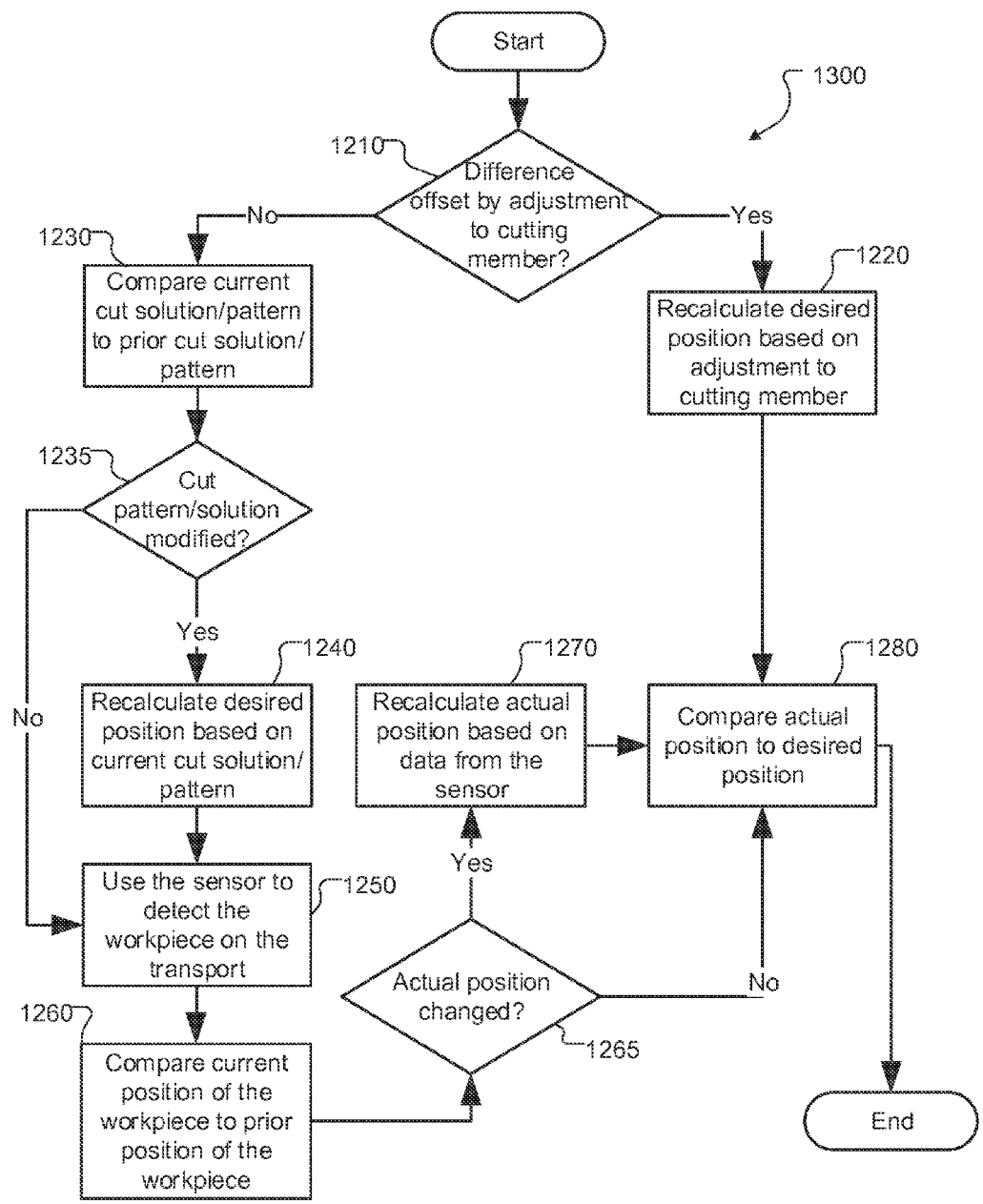
FIG. 12 is a flow chart of an example corrective action confirmation process.

FIG. 12 is a flow chart of an example corrective action confirmation process 1200, in accordance with various embodiments. In various embodiments process 1200 may include one or more embodiments of operation 860 of process 800. While the operations of process 1200 are shown arranged in a particular order with each of the operations illustrated only once, it is to be understood that in various embodiments one or more of the operations may be repeated, omitted, or performed out of order.

The process 1200 may begin at operation 1210. At operation 1210, the computer system may determine whether the positional error has been offset by an adjustment to the cutting member. If the computer system determines that the positional error has been offset by an adjustment to the cutting member, the process 1210 may proceed to operation 1220.

In operation 1220, the computer system may recalculate the desired position based on the adjustment to the cutting member. For example, the computer system may offset the desired position by the same distance/angle as the adjustment to the cutting member. Alternatively, in other embodiments the computer system may instead recalculate the actual position by offsetting the actual position to the same degree as the adjustment to the cutting member. In still other embodiments, the computer system may recalculate the cut solution/pattern based on the adjustment to the cutting member.

Next, at operation 1280, the computer system may compare the actual position to the desired position, after which the process 1200 may end. The actual/desired position may be the recalculated actual/desired position.

However, if the computer system determines at operation 1210 that the positional error was not offset by an adjustment to the cutting member, the process 1200 may proceed to operation 1230. At operation 1230, the computer system may compare the current cut solution/pattern to a prior cut solution/pattern to determine whether a modification was made to the cut solution/pattern (e.g., to offset positional error, as in operation 1120 of process 1100). If the computer system determines that the cut solution/pattern was not modified, the process 1200 may proceed to operation 1250. If the computer system determines that the cut solution/pattern was modified, the process 1200 may proceed to operation 1240.

At operation 1240, the computer system may recalculate the desired position based on the current cut solution/pattern, and the process 1200 may then proceed to operation 1250.

At operation 1250, the sensor (e.g., sensor 120) may be used again to detect the workpiece on the transport (e.g., transport 110). Next, at operation 1260, the computer system may compare the current position of the workpiece to a prior position of the workpiece. For example, the computer system may select a point along the workpiece (e.g., the geometric center of the workpiece) and compare the location of that point in the current position to the location of that point in the prior position. Alternatively, in other embodiments, the computer system may determine the current position of the workpiece generally as described above with regard to process 900, or in any other suitable manner, and operations 1260 and 1265 may be omitted (i.e., the process 1200 may proceed from 1250 directly to operation 1270).

Next, at operation 1265, the computer system may determine whether the actual position of the workpiece has changed (i.e., whether the current position is different from the prior position). If the computer system determines that the actual position has not changed, the process may proceed to operation 1280. However, if the computer system determines that the actual position has changed, the process may proceed to operation 1270.

At operation 1270, the computer system may recalculate the actual position based on data from the sensor. In some embodiments, the computer system may determine the current position of the workpiece generally as described above with regard to process 900. Alternatively, the computer system may determine the current position in any other suitable manner. The process 1200 may then proceed to operation 1280, after which the process may end.

In various embodiments, the cutting member(s) may be one or more saws or chip heads. In one embodiment, at least one cutting member may be a saw and another cutting member may be a chip head. In some embodiments, the cutting members may be one or more saw(s) that are mounted along an arbor and coupled with a slewing assembly configured to selectively move the saw(s) along the arbor while a workpiece is being cut by the saw(s). An example of a slewing assembly is described in U.S. Pat. No. 7,861,754 ("Edger With Staggered Saws," also owned by Applicants), the disclosure of which is incorporated by reference herein.

Figure 14:
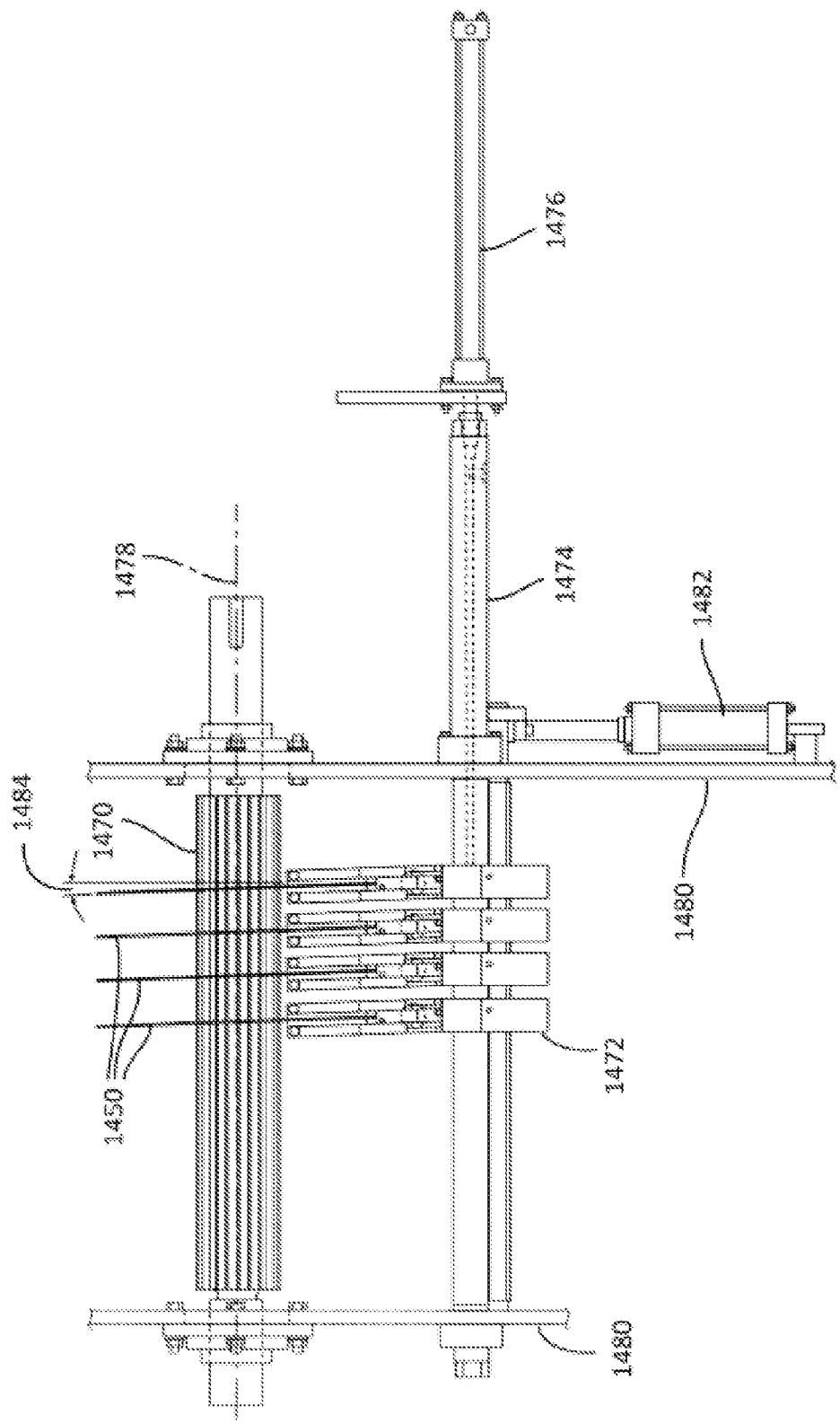
FIG. 14 illustrates a plan view of a cutting assembly suitable for use with a dynamic workpiece positioning system.

FIG. 14 illustrates a plan view of an embodiment of a cutting assembly 1400 suitable for use with various embodiments of the present disclosure. The cutting assembly 1400 may be, but is not limited to, an edger, a canter/slabber, a straight sawing gang, a curve sawing gang, or another type of primary or secondary breakdown machine that includes movable cutting members. As illustrated, the cutting assembly 1400 may include cutting members 1450 mounted along an arbor 1470. Arbor 1470 may be rotatably mounted to one or more portions of a frame 1480, such as a saw box, and selectively rotatable around an axis of rotation 1478. In some embodiments, the cutting assembly may have two or more arbors. Various embodiments may have either horizontal arbor(s) or vertical arbor(s).

Cutting members 1450 may be coupled with corresponding guides 1472. Each of the guides 1472 may be mounted on a corresponding shaft 1474 and operatively coupled with a corresponding slew actuator 1476 to collectively form a slew assembly. Slew actuators 1476 may be selectively actuable to move guides 1472 along shafts 1474 generally parallel to arbor 1470 to thereby move the corresponding saws 1450 along arbor 1470. In some embodiments, slew actuators 1476 may be linear positioners (e.g., hydraulic or pneumatic cylinders). In the embodiment illustrated in FIG. 14, the slew actuators 1476 and shafts 1474 are vertically aligned, such that only the uppermost of each is visible. However, the types, arrangement, and configuration of the slew actuator(s) and other components of the slew assembly may vary among embodiments.

Optionally, the cutting assembly 1400 may further include a skew actuator 1482 coupled with one or more components of the slewing assembly. Skew actuator 1482 may include one or more linear positioners or other actuator(s), and may be selectively actuable to skew the saws 1450 relative to the arbor 1470.

However, other embodiments may lack a skew actuator 1482. For example, the cutting assembly 1400 may be a straight sawing gang/edger, and slewing assembly 1474 may be operable to slew saws 1450 along arbor 1470 while a workpiece is being cut. This may allow the cutting assembly to be used to saw a workpiece along the cut lines of a desired cut solution even if the workpiece is slightly skewed relative to the desired position for the cut pattern. Slewing the cutting members 1450 in a given direction while they are engaged in cutting the workpiece may apply pressure against the corresponding side of the cutting member(s). This pressure may push the cutting member(s) a short distance to one side, introducing a slight skew angle 1484. In various embodiments, where the normal (unskewed) position of the saw blade is considered to be 0 degrees, slewing the saw(s) while cutting the workpiece may introduce a skew angle of up to 5 degrees in either direction, relative to the normal position. In other embodiments, the saw(s) may be selectively slewed while cutting the workpiece to introduce a desired skew angle of up to 5 degrees. Alternatively, the maximum skew angle may be an angle that is greater than, or less than, 5 degrees relative to the normal position.

Thus, in embodiments with a straight-sawing cutting assembly, the computer system may be configured to determine whether a workpiece that is skewed relative to the desired position can be cut according to the desired cut solution by slewing the cutting member(s). For example, where the workpiece has been positioned and is being conveyed to the cutting members in a slightly skewed position, the computer system may calculate a corrective skew angle for the cutting member(s) that would allow the workpiece to be cut according to the desired cut solution without repositioning the workpiece. The computer system may determine whether the calculated skew angle is within a range of obtainable skew angles for the cutting member(s). If the calculated skew angle is within that range, the computer system may automatically adjust the cut pattern and/or control the cutting assembly to slew the cutting member(s) as needed to produce the calculated skew angle. Alternatively, after determining that the workpiece is skewed relative to the desired position, the computer system may adjust the cut pattern or control the cutting assembly to slew (and thereby skew) the cutting member(s) without calculating the skew angle required to cut the workpiece according to the cut solution.

Optionally, in some embodiments the computer system may be configured to calculate an adjustment to the cutting member(s) that increases the limit to which the cutting member(s) can be skewed to compensate for workpiece positional errors. For example, where the cutting member is a circular saw, decreasing the cutting depth by raising the saw may increase the maximum angle at which the saw can be skewed by slewing during the cut.

FIGS. 15A-D illustrate schematic views of saw positions relative to a workpiece, in accordance with various embodiments. FIGS. 15A and 15B show schematic plan and side views, respectively, of a saw 1550 that is being slewed while cutting a workpiece 1502. In FIG. 15A, slewing saw 1550 while cutting the workpiece has induced a skew angle of approximately 3 degrees. As the saw is slewed during engagement with the workpiece, the maximum skew angle of the saw is limited in part by the width of the cut and the length of the portion of the saw disposed within the cut. This is because the lagging edge of the saw engages the wood on one side of the cut while the leading edge is cutting. Thus, the greater the distance between the leading edge and the lagging edge within the cut, the smaller the potential skew angle of the saw. Decreasing this distance—such as by repositioning either the saw or the workpiece to reduce the maximum length of the saw within the cut—may increase the maximum angle to which the saw(s) can be skewed by slewing. For example, in FIGS. 15C and 15D, saw 1550 is shown repositioned relative to workpiece 1502 such that the workpiece is further from the rotational axis of the saw. This reduces the distance between the leading edge and the lagging edge of the saw within the cut, allowing the saw to be skewed to an angle of approximately 5 degrees by slewing the saw as it cuts the workpiece. Alternatively, the maximum length of the saw within the cut can be increased to limit the maximum skew angle that can be introduced by slewing.

These examples are provided merely by way of illustration, and various other skew angles and ranges are contemplated. In other embodiments, different skew angles and ranges of skew angles may be provided by adjusting the position of the saw relative to the workpiece, adjusting the position of the workpiece relative to the saw, slewing/pushing the workpiece while sawing (instead of, or in addition to, slewing the saw), and/or using a saw of a larger or smaller diameter. For example, in some embodiments saws of various diameters may be arrayed on the arbor, and one or more of the saws may be selected for use based at least in part on the diameter of the saw(s).

The computer system may be configured to perform any or all of the above calculations, operations, and/or functions. In particular, the computer system may be configured to calculate/determine a desired skew angle for the saw(s) and to cause the saw(s) to be adjusted, controlled, and/or selected to cut the workpiece according to the desired cut solution/pattern. As such, in some embodiments a simple straight sawing system may be converted to a system with limited curve-sawing functionality and/or positional error correction functionality by adding a sensor and a computer system generally in accordance with embodiments described herein.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A workpiece positioning system comprising:
a transport configured to convey a workpiece in a flow direction toward a cutting member;
a sensor configured to detect a workpiece on the transport upstream of the cutting device;
a projector, and
a computer system operatively coupled with the sensor and the projector, the computer system programmed with instructions operable, upon execution by a processor, to
determine, based on data from the sensor, a first actual position of the workpiece relative to the transport;
compare the first actual position to a cut solution for the workpiece; and
generate, based at least on the comparison, one or more commands configured to cause the projector to project an image onto the transport or the workpiece to indicate the cut solution or a desired position that corresponds to the cut solution, to thereby guide repositioning of the workpiece relative to the transport to the desired position.

2. The workpiece positioning system of claim 1, wherein the sensor includes one or more of a vision camera and a laser triangulation sensor.

3. The workpiece processing system of claim 1, wherein the instructions are further operable, upon execution by the processor, to calculate the cut solution based at least on data from the sensor.

4. The workpiece processing system of claim 1, wherein the sensor is configured to detect one or more additional positions of the workpiece as the workpiece is moved relative to the transport, and the instructions are further operable, upon execution by the processor, to recalculate or modify the cut solution based at least on corresponding additional data from the sensor.

5. A method of positioning a workpiece on a support, the method comprising:
using a sensor to detect the workpiece on the support;
determining by a computer system, based on data from the sensor, a first actual position of the workpiece relative to the support;
comparing, by the computer system, the first actual position to a cut solution for the workpiece; and
generating by the computer system, based at least on the comparison, one or more commands configured to cause a projector to project an image onto the transport to indicate the cut solution or a desired position that corresponds to the cut solution to thereby cause the workpiece to be moved relative to the transport to the desired position.

6. The method of claim 5, further including calculating, by the computer system, one or more of the cut solution, a cut pattern that corresponds to the cut solution, or the desired position based at least on the data from the sensor.

7. The method of claim 5, further including:
moving the workpiece from the first actual position to one or more additional positions; and
using the sensor to detect the workpiece in the one or more additional positions to thereby obtain additional information about the workpiece.

8. A method of modifying a workpiece processing system, wherein the workpiece processing system includes a transport and a cutting member positioned along or downstream of the transport, the method comprising:
positioning a sensor relative to the transport, wherein the sensor is operable to detect a workpiece on the transport;
coupling a computer system with the sensor and a projector, wherein the computer system is programmed with instructions operable, upon execution, to
determine, based on data from the sensor, a first actual position of the workpiece relative to the transport;
compare the first actual position to a cut solution for the workpiece; and
generate, based at least on the comparison, one or more commands configured to cause the projector to project onto the transport or the workpiece an image that indicates the cut solution or a desired position that corresponds to the cut solution, to thereby cause the workpiece to be moved relative to the transport to the desired position.

9. The workpiece processing system of claim 1, wherein the image includes a visual representation of the workpiece or a visual representation of a dimensional model of the workpiece, and the one or more commands are configured to cause the projector to project the visual representation onto the transport at the desired position to thereby indicate the desired position.

10. The workpiece processing system of claim 1, wherein the image includes a visual representation of an alignment mark or a visual representation of a cut pattern that corresponds to the cut solution.

11. The workpiece processing system of claim 1, wherein the image includes a visual representation of a cut line that indicates an actual position of the cutting member.

12. The workpiece processing system of claim 11, wherein the cutting member is one of a plurality of saws, and the image includes visual representations of cut lines along the planes of some or all of the saws.

13. The workpiece processing system of claim 11, wherein the instructions are further operable, upon execution by the processor, to cause the projector to reposition the visual representation of the cut line based on a change in the actual position of the cutting member, such that the projected cut line indicates the position of the cutting member in real time.

14. The workpiece processing system of claim 1, wherein the image includes a visual representation of the workpiece or a dimensional model of the workpiece, and a visual representation of an alignment mark or a cut pattern that corresponds to the cut solution.

15. The method of claim 5, wherein the image includes a visual representation of the workpiece or of a dimensional model of the workpiece, and the one or more commands are configured to cause the projector to project the visual representation onto the transport at the desired position to thereby indicate the desired position.

16. The method of claim 15, further including generating, by the computer, the dimensional model of the workpiece based at least on the data from the sensor.

17. The method of claim 7, further including recalculating or modifying the cut solution or a corresponding cut pattern, by the computer system, based at least on the additional information.

18. The method of claim 17, further including generating, by the computer system, one or more commands configured to cause the projector to modify or reposition the image based at least on the recalculating or modifying.

19. The method of claim 7, wherein the image includes a visual representation of a cut line, the method further comprising:
   determining, by the computer system, a change in a position of a cutting member downstream of the workpiece; and
   generating, by the computer system, one or more commands configured to cause the projector to move the visual representation to reflect the change in position, such that the visual representation indicates the actual position of the cutting member in real time.

20. The method of claim 19, wherein the image includes a visual representation of an alignment mark, the method further comprising generating, by the computer system, one or more commands configured to cause the projector to move the alignment mark based on the actual position of the cutting member.

21. The method of claim 8, further including positioning the projector above the transport or proximal to the cutting member.

22. The method of claim 8, wherein the sensor includes one or more of a laser triangulation sensor or a vision camera.

23. The method of claim 8, wherein the image includes a visual representation of the workpiece or of a dimensional model of the workpiece, and the one or more commands are configured to cause the projector to project the visual representation onto the transport at the desired position to thereby indicate the desired position.

24. The method of claim 8, wherein the image includes a visual representation of an alignment mark or a visual representation of a cut pattern that corresponds to the cut solution.

25. The method of claim 8, wherein the image includes a visual representation of a cut line that indicates an actual position of the cutting member.

26. The method of claim 25, wherein the cutting member is one of a plurality of saws, and the image includes visual representations of cut lines along the planes of some or all of the saws.

27. The method of claim 25, wherein the instructions are further operable, upon execution by the processor, to determine a change in the actual position of the cutting member and to cause the projector to reposition the visual representation of the cut line based on said change, such that the projected cut line indicates the position of the cutting member in real time.

28. A non-transitory computer-readable medium comprising instructions operable, upon execution by a processor, to:
   determine, based on data from a sensor positioned to detect a workpiece on a transport, a first actual position of the workpiece relative to the transport;
   compare the first actual position to at least one cut solution for the workpiece; and
   based at least on the comparison, cause a projector to project an image onto the transport or the workpiece to indicate the cut solution or a desired position that corresponds to the cut solution, to thereby guide repositioning of the workpiece to the desired position.

29. The non-transitory computer-readable medium of claim 28, wherein the instructions are further operable, upon execution by the processor, to generate the cut solution and/or a corresponding cut pattern based at least on the data from the sensor.

30. The non-transitory computer-readable medium of claim 28, wherein the instructions are further operable, upon execution by the processor, to generate a dimensional model of the workpiece based at least on data from said sensor and/or data from a second sensor positioned to detect the workpiece upstream of the transport.

31. The non-transitory computer-readable medium of claim 30, wherein the image includes a visual representation of the dimensional model, and the one or more commands are configured to cause the projector to project the visual representation onto the transport at the desired position to thereby indicate the desired position.

32. The non-transitory computer-readable medium of claim 28, wherein the image includes a visual representation of the workpiece or of a dimensional model of the workpiece, and the one or more commands are configured to cause the projector to project the visual representation onto the transport at the desired position to thereby indicate the desired position.

33. The non-transitory computer-readable medium of claim 28, wherein the image includes a visual representation of an alignment mark or a visual representation of a cut pattern that corresponds to the cut solution.

34. The non-transitory computer-readable medium of claim 28, wherein the instructions are further operable, upon execution by the processor, to determine a position of a cutting member of a cutting assembly based at least on data from the sensor or the cutting assembly, and wherein the image includes a visual representation of a cut line that indicates an actual position of the cutting member.

35. The non-transitory computer-readable medium of claim 34, wherein the cutting device includes a plurality of saws, the cutting member is one of the saws, and the image includes visual representations of cut lines along the planes of some or all of the saws.

36. The non-transitory computer-readable medium of claim 34, wherein the instructions are further operable, upon execution by the processor, to determine a change in the actual position of the cutting member and to cause the projector to reposition the visual representation of the cut line based on said change, such that the projected cut line indicates the position of the cutting member in real time.

* * * * *